United States Patent
Jeon et al.

(10) Patent No.: US 8,462,853 B2
(45) Date of Patent: Jun. 11, 2013

(54) METHOD AND AN APPARATUS FOR PROCESSING A VIDEO SIGNAL

(75) Inventors: Byeong Moon Jeon, Seoul (KR); Seung Wook Park, Seoul (KR); Joon Young Park, Seoul (KR); Jae Won Sung, Seoul (KR); Hyun Wook Park, Daejeon (KR); Jee Hong Lee, Daejeon (KR); Jin Young Lee, Daejeon (KR); Dong San Jun, Daejeon (KR); Yinji Piao, Daejeon (KR)

(73) Assignees: LG Electronics Inc., Seoul (KR); Korea Advanced Institute of Science and Technology, Seoul (KR)

( * ) Notice: Subject to any disclaimer, the term of this patent is extended or adjusted under 35 U.S.C. 154(b) by 406 days.

(21) Appl. No.: 12/738,239

(22) PCT Filed: Oct. 16, 2008

(86) PCT No.: PCT/KR2008/006113
§ 371 (c)(1),
(2), (4) Date: Apr. 15, 2010

(87) PCT Pub. No.: WO2009/051419
PCT Pub. Date: Apr. 23, 2009

(65) Prior Publication Data
US 2010/0220790 A1    Sep. 2, 2010

Related U.S. Application Data

(60) Provisional application No. 60/980,432, filed on Oct. 16, 2007, provisional application No. 60/980,434, filed on Oct. 16, 2007, provisional application No. 60/980,435, filed on Oct. 16, 2007, provisional application No. 61/016,808, filed on Dec. 27, 2007, provisional application No. 61/029,577, filed on Feb. 19, 2008, provisional application No. 61/031,705, filed on Feb. 27, 2008, provisional application No. 61/075,759, filed on Jun. 26, 2008.

(51) Int. Cl.
*H04N 7/32* (2006.01)
*H04N 5/91* (2006.01)

(52) U.S. Cl.
USPC ............ 375/240.16; 375/240.12; 375/E7.133

(58) Field of Classification Search
None
See application file for complete search history.

(56) References Cited

U.S. PATENT DOCUMENTS 8,149,910 B2 *  4/2012   Tanizawa et al. ........ 375/240.12
2005/0013369 A1 *  1/2005   Lee .......................... 375/240.16

(Continued)

FOREIGN PATENT DOCUMENTS

JP        2004-040575 A        2/2004

OTHER PUBLICATIONS

Haskell et al, "Digital Video: An Introduction to MPEG-2", Chapman & Hall, 1997, ISBN: 0-412-08411-2, p. 174.*

(Continued)

*Primary Examiner* — Gims S. Philippe
*Assistant Examiner* — Reza Aghevli
(74) *Attorney, Agent, or Firm* — Fish & Richardson P.C.

(57) ABSTRACT

A method of decoding a video signal on a decoding apparatus includes receiving prediction mode information, interpolating information and a residual of a current block, reconstructing an interpolating pixel using the interpolating information and a neighbor block, and reconstructing the current block using the interpolating pixel, the prediction mode information and the residual, wherein the interpolating information is generated based on a location of the current block. High reconstruction rate can be obtained by improving the related art method having limited intra prediction modes available for a current block located on a boundary area of a picture in encoding in a manner of reconstructing and using an interpolating pixel based on interpolating information.

10 Claims, 35 Drawing Sheets

U.S. PATENT DOCUMENTS

| | | | |
|---|---|---|---|
| 2006/0120450 A1* | 6/2006 | Han et al. | 375/240.03 |
| 2006/0245495 A1* | 11/2006 | Han et al. | 375/240.13 |
| 2006/0280253 A1* | 12/2006 | Tourapis et al. | 375/240.16 |
| 2007/0053443 A1* | 3/2007 | Song | 375/240.24 |
| 2007/0121728 A1* | 5/2007 | Wang et al. | 375/240.18 |
| 2007/0171979 A1* | 7/2007 | Eerenberg et al. | 375/240.24 |
| 2007/0195887 A1* | 8/2007 | Comer | 375/240.21 |
| 2007/0201564 A1* | 8/2007 | Joch et al. | 375/240.29 |

OTHER PUBLICATIONS

PCT International Search Report dated Mar. 30, 2010 for Application No. PCT/KR2008/006113, 3 pages.

International Search Report dated Mar. 30, 2009 for Application No. PCT/KR2008/006113, 2 pages.

* cited by examiner 16 x 16

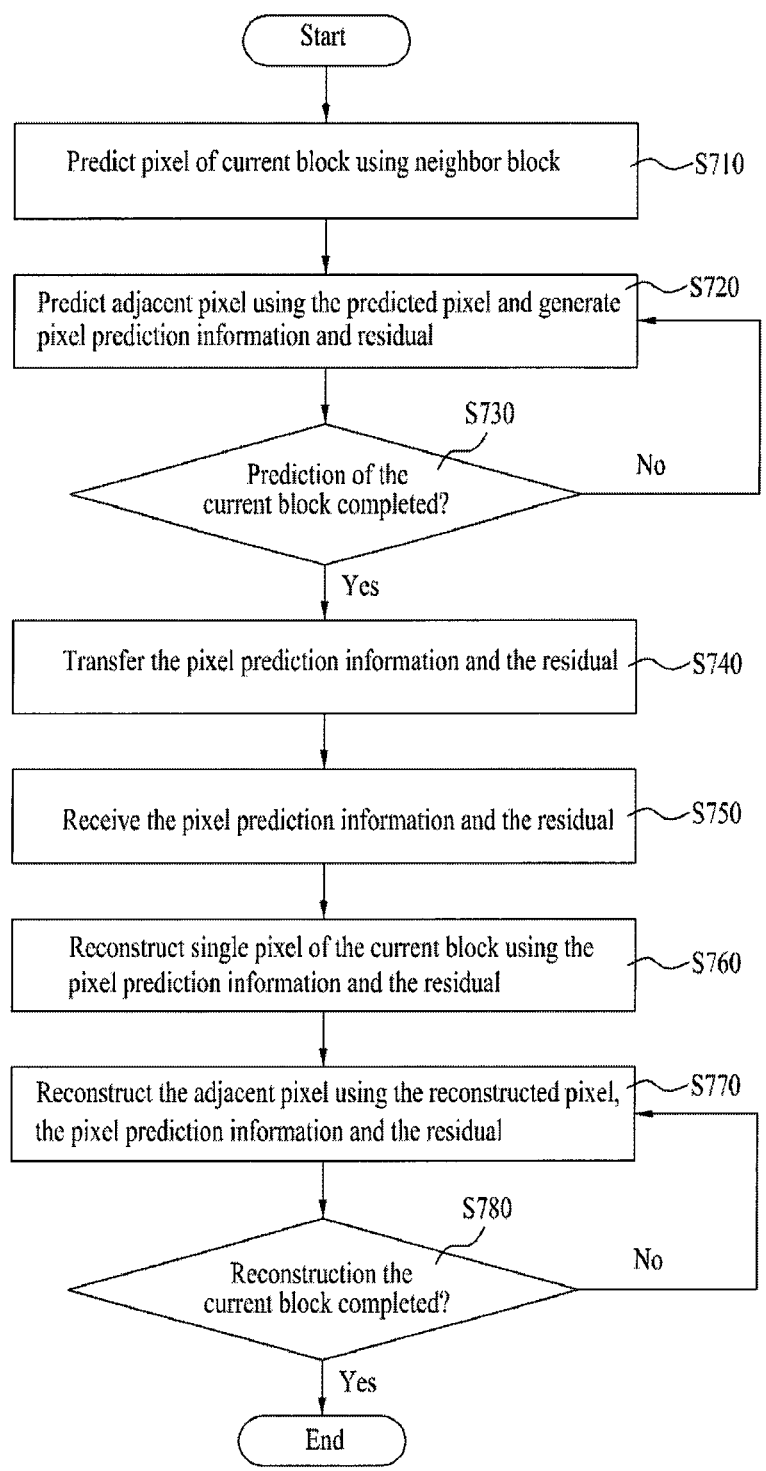

FIG. 20

| | mv v<br>Ref. # 1 | mv UR<br>Ref. # 1 |
|---|---|---|
| mv 2<br>Ref. # 0 | mv c | |

FIG. 22
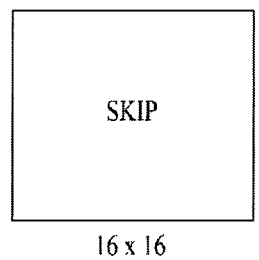
16 x 16
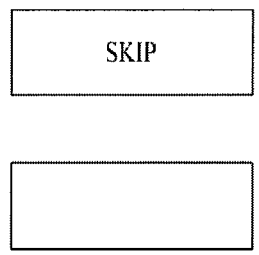
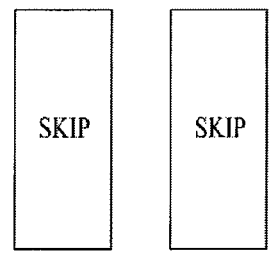
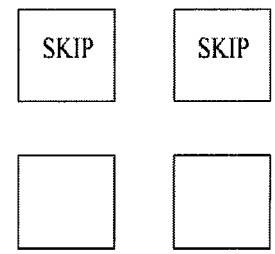

METHOD AND AN APPARATUS FOR PROCESSING A VIDEO SIGNAL

CROSS REFERENCE TO RELATED APPLICATIONS

This application is a U.S. National Phase Application under 35 U.S.C. §371 of International Application PCT/KR2008/006113, filed on Oct. 16, 2008, which claims the benefit of U.S. Provisional Application Nos. 60/980,432, 60/980,434, and 60/980,435 filed on Oct. 16, 2007, Provisional Application No. 61/016,808, filed on Dec. 27, 2007, Provisional Application No. 61/029,577, filed on February 19, 2008, Provisional Application No. 61/031,705, filed on Feb. 27, 2008 and Provisional Application No. 61/075,759, filed on Jun. 26, 2008 the entire contents of which are hereby incorporated by reference in their entireties.

TECHNICAL FIELD

The present invention relates to a method and apparatus for processing a video signal, and more particularly, to a video signal processing method and apparatus for encoding or decoding video signals.

BACKGROUND ART

Generally, compression coding means a series of signal processing techniques for transferring digitalized information via a communication circuit or storing digitalized information in a format suitable for a storage medium. Targets of compression coding include audio, video, character, etc. In particular, a technique of performing compression coding on video is called video compression. Video sequence is generally characterized in having spatial redundancy and temporal redundancy.

DISCLOSURE OF THE INVENTION

Technical Problem

However, if the spatial redundancy and the temporal redundancy are not sufficiently eliminated, a compression rate in coding a video signal is lowered. If the spatial redundancy and the temporal redundancy are excessively eliminated, it is unable to generate information required for decoding a video signal to degrade a reconstruction ratio.

Technical Solution

Accordingly, the present invention is directed to an apparatus for processing a video signal and method thereof that substantially obviate one or more of the problems due to limitations and disadvantages of the related art.

An object of the present invention is to provide an apparatus for processing a video signal and method thereof, by which compression efficiency can be raised by means of using all nine kinds of intra prediction modes non-limited to blocks located in a boundary area of a picture.

Another object of the present invention is to provide an apparatus for processing a video signal and method thereof, by which accuracy of motion vector prediction can be enhanced using various motion vector predictor candidates.

Advantageous Effects

Accordingly, the present invention provides the following effects and/or advantages.

First of all, a video signal processing method according to the present invention can enhance coding efficiency by means of using all nine kinds of intra prediction modes non-limited to blocks located in a boundary area of a picture.

Secondly, a video signal processing method according to the present invention can enhance accuracy of prediction and coding efficiency in a manner that a current block uses adjacent pixels within the current block for intra prediction as well as pixels of a neighbor block.

Thirdly, a video signal processing method according to the present invention can reduce a bitrate using an intra-skip mode.

Fourthly, a video signal processing method according to the present invention enables a current frame to be accurately predicted using a separate intra prediction mode in a manner that a predicted block is not limited to the block located at a top or left of a current block.

Fifthly, a video signal processing method according to the present invention adopts a predictor similar to a motion vector of a current block using various motion vector predictor candidates, thereby enabling accurate motion prediction.

Sixthly, a video signal processing method according to the present invention determines a motion vector predictor candidate according to homogeneity between current and previous blocks and a type of the current block, thereby enhancing accuracy of motion prediction of the current block.

Seventhly, a video signal processing method according to the present invention determines a motion vector predictor by considering a distance between a frame indicated by a reference index of a current block and a frame indicated by a reference index of a neighbor block, thereby enhancing accuracy of prediction in a manner that the determined motion vector predictor has a value more similar to that of a motion vector of the current block.

Eighthly, a video signal processing method according to the present invention can raise coding efficiency by further activating a skip mode using a partially skip mode and can also raise a reconstruction ratio of a current block using motion vectors more than those of a related art skip mode.

Ninthly, a video signal processing method according to the present invention uses at least two motion vectors within 16*16 block by way of using 8*8 spatial direct mode, thereby having a higher reconstruction ratio in case that a current block is located on a boundary area or a small object is moving.

Tenthly, a video signal processing method according to the present invention rearranges residual signals so that a block having a small residual value is located at left or top in a row or column prior to discrete cosine transform, thereby obtaining higher compression effect in a manner that discrete cosine transform coefficients are dominant on a left side (near DC component) in performing the discrete cosine transform.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is a flowchart of a sequence for performing a frame-pixel prediction mode according to a second embodiment of the present invention;

FIG. 20 and FIG. 21 are diagrams for a method of determining a scaled motion vector predictor according to a seventh embodiment of the present invention;

FIG. 22 is a diagram of a block size used in a partially skip mode according to an eighth embodiment of the present invention;

BEST MODE

Figure 1:
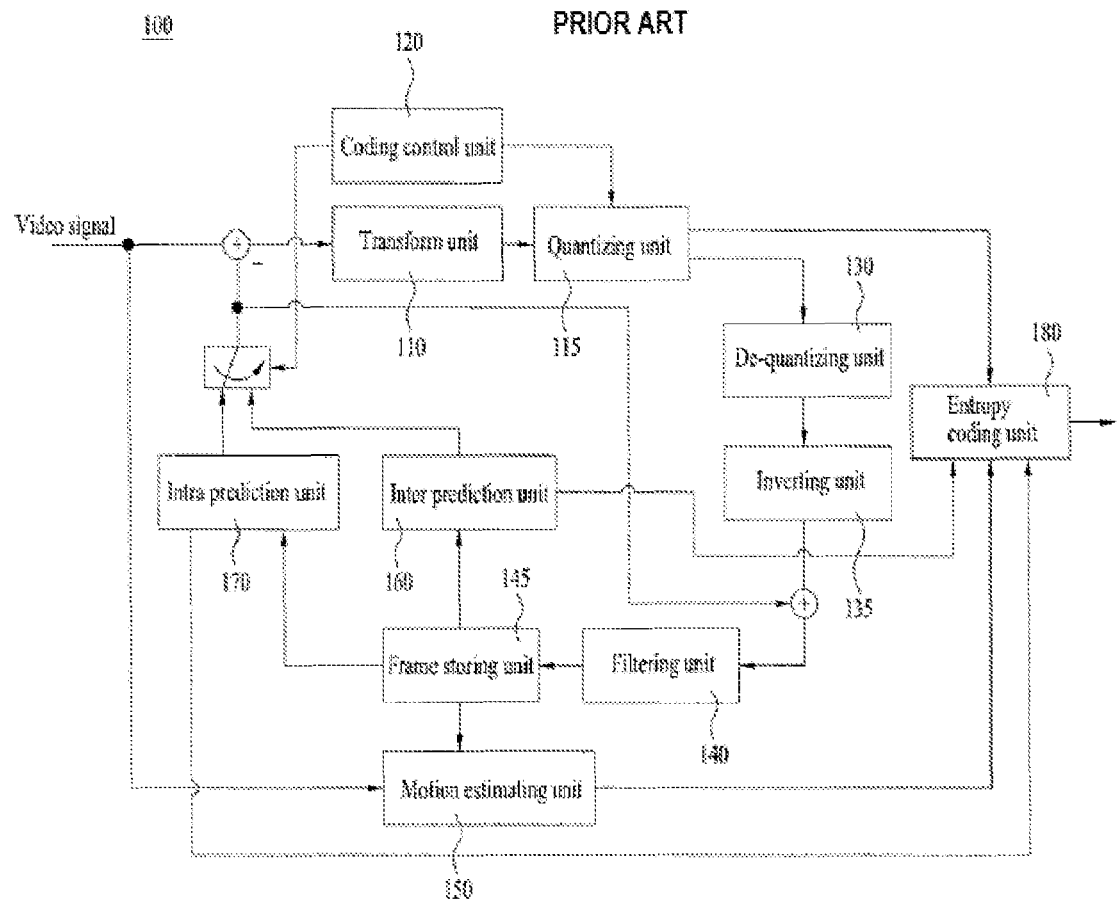
FIG. 1 is a schematic block diagram of an apparatus for encoding a video signal according to one embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a video signal according to the present invention includes receiving prediction mode information, interpolating information and a residual of a current block, reconstructing an interpolating pixel using the interpolating information and a neighbor block, and reconstructing the current block using the interpolating pixel, the prediction mode information and the residual, wherein the interpolating information is generated based on a location of the current block.

According to the present invention, the interpolating information includes pixel information of the neighbor block used to generate the interpolating pixel and information of a scheme for generating the interpolating pixel.

According to the present invention, the interpolating information further includes flag information indicating whether the current block is located on a boundary area of a picture.

To achieve these and other advantages and in accordance with the purpose of the present invention, as embodied and broadly described, a method of processing a video signal according to the present invention includes receiving the video signal including pixel prediction information and a residual of a current block, reconstructing a single pixel of the current block using the pixel prediction information and the residual, and reconstructing an adjacent pixel using the reconstructed pixel, the pixel prediction information and the residual, wherein the pixel prediction information includes a prediction pixel, a prediction scheme and a prediction direction used for intra prediction of the adjacent pixel and wherein the adjacent pixel is included in the current block and is predicted using other pixels included in the current block.

According to the present invention, the prediction pixel is the pixel located in the current block or a reconstructed neighbor block.

According to the present invention, the prediction scheme includes a scheme for using a mean value of adjacent pixels and a scheme for prediction according to directionality.

According to the present invention, the scheme for the prediction according to the directionality includes calculating a difference between two closest pixels in each direction centering on a current pixel and performing the prediction using a mean value of the two pixels in the direction having the smallest difference.

According to the present invention, the prediction direction corresponds to one of directions of an intra prediction mode except a DC mode and the prediction direction is a direction having a smallest value of a difference between two pixels closest to the current pixel in each direction centering of a current pixel.

To further achieve these and other advantages and in accordance with the purpose of the present invention, a method of processing a video signal according to the present invention includes receiving the video signal including motion vector predictor information and a difference of a motion vector, determining a motion vector predictor candidate set using a spatial predictor and a temporal predictor, determining motion vector predictors using the motion vector predictor information, and performing motion compensation on a current block using the motion vector predictors and the difference of the motion vector, wherein the motion vector predictors are generated using the motion vector predictor candidate set.

According to the present invention, the motion vector predictor candidate set determining depends on whether the current block adopts a skip mode.

According to the present invention, the skip mode includes one selected from the group consisting of 8*8 block, 8*16 block, 16*8 bock and 16*16 block as a unit block.

According to the present invention, if the current block is in the skip mode, the motion vector predictor candidate set determining is based on a presence or non-presence of matching between a component-x of the spatial predictor, a component-x of the temporal predictor, a component-y of the spatial predictor and a component-y of the spatial predictor.

According to the present invention, if the current block is not in the skip mode, the motion vector predictor candidate set determining is based on a distance between a component-x of the spatial predictor and a component-x of the temporal predictor and a distance between a component-y of the spatial predictor and a component-y of the spatial predictor.

According to the present invention, the motion vector predictor information indicates information on the motion vector predictor used for the motion vector prediction of the current block.

According to the present invention, the method further includes selecting a motion vector competition using the spatial predictor and the temporal predictor prior to determining the motion vector predictor candidate set.

According to the present invention, the motion vector competition selecting is determined based on sizes of the spatial and temporal predictors.

According to the present invention, the method further includes selecting a motion vector competition based on the motion vector of a previous picture and a type of the current block prior to determining the motion vector predictor candidate set.

According to the present invention, if an average of a size of the motion vector of the previous picture is 0 or equal to or smaller than 2, the motion vector predictor set including the spatial predictor and the temporal predictor is determined.

According to the present invention, if an average of a size of the motion vector of the previous picture is greater than 2 and if the type of the current block is a skip mode or 16*16 block, the motion vector predictor set including the spatial predictor and the temporal predictor is determined.

According to the present invention, the motion vector predictor determining further includes generating the motion vector predictor scaled by considering a distance between the current block and a block for performing motion estimation.

To further achieve these and other advantages and in accordance with the purpose of the present invention, an apparatus for processing a video signal according to the present invention includes a video signal receiving unit receiving the video signal including prediction mode information, interpolating information and a residual of a current block, an interpolating pixel reconstructing unit reconstructing an interpolating pixel using the interpolating information and a neighbor block, and a current block reconstructing unit reconstructing the current block using the interpolating pixel, the prediction mode information and the residual, wherein the interpolating pixel reconstructing unit uses the interpolating information generated based on a location of the current block.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings. General terminologies used currently and globally are selected as terminologies used in the present invention. And, there are terminologies arbitrarily selected by the applicant for special cases, for which detailed meanings are explained in detail in the description of the preferred embodiments of the present invention. Hence, the present invention should be understood not with the names of the terminologies but with the meanings of the terminologies.

Specifically, coding in the present invention should be understood as the concept including both encoding and decoding. And, a neighbor block in the present invention should be understood as a block located neighbor to a current decoding-completed block.

FIG. 1 is a schematic block diagram of an apparatus 100 for encoding a video signal according to one embodiment of the present invention. Referring to FIG. 1, a video signal encoding apparatus 100 according to one embodiment of the present invention includes a transform unit 110, a quantizing unit 115, a coding control unit 120, a de-quantizing unit 130, an inverting unit 135, a filtering unit 140, a frame storing unit 145, a motion estimating unit 150, an inter prediction unit 160, an intra prediction unit 170, and an entropy coding unit 180.

The transform unit 110 obtains a transform coefficient value by transforming a pixel value. For this, discrete cosine transform (DCT) or wavelet transform is usable. In particular, the discrete cosine transform raises compression efficiency by dividing an inputted video signal into 8*8 blocks and concentrating a signal on the video signal having a small number. And, embodiment of discrete cosine transform proposed by the present invention will be described later with reference to FIG. 23 and FIG. 24. The quantizing unit 115 quantizes the transform coefficient value outputted by the transform unit 110. The coding control unit 120 controls whether to perform intra-picture coding or inter-picture coding on a specific block or frame. The de-quantizing unit 130 and the inverting unit 135 de-quantize the transform coefficient value and then reconstruct an original pixel value using the de-quantized transform coefficient value.

The filtering unit 140 is applied to each coded macroblock to reduce block distortion. In this case, a filter smoothens edges of a block to enhance an image quality of a decoded picture. And, a selection of this filtering process depends on a boundary strength and gradient of an image sample around a boundary. The filtered picture is outputted or stored in the frame storing unit 145 to be used as a reference picture.

The motion estimating unit 150 searches reference pictures for a reference block most homogenous to a current block using the reference pictures stored in the frame storing unit 145. And, the motion estimating unit 150 forwards position information of the searched reference block and the like to the entropy coding unit 180 so that the forwarded position information and the like can be included in a bitstream.

The inter prediction unit 160 performs prediction of a current picture using the reference picture and forwards inter-picture coding information to the entropy coding unit 180. In this case, the inter-picture coding information includes a residual that is a difference between a current block and a predicted block (predictor). Fourth to ninth embodiments for the inter prediction unit 160 will be explained in detail later with reference to the accompanying drawings.

The intra prediction unit 170 performs intra-picture prediction from a decoded sample within the current picture and forwards intra-picture coding information to the entropy coding unit 180. In particular, the intra prediction unit 170 predicts a current block using pixels of a neighbor block within a current picture and then generates a residual that is a difference between the current block and a predicted current block. First to third embodiments for the intra prediction unit 170 will be explained in detail with reference to FIGS. 3A to 11C.

The entropy coding unit 180 generates a video signal bitstream by entropy-coding the quantized transform coefficient, the inter-picture coding information, the intra-picture coding information and the reference block information inputted from the motion estimating unit 150. In this case, the entropy coding unit 180 can use variable length coding (VLC) scheme and arithmetic coding scheme. The variable length coding scheme transforms inputted symbols into continuous codeword. In this case, the length of the codeword may be variable. For instance, frequently generated symbols are represented as short codeword and non-frequently generated symbols are represented as long codeword. As the variable length coding scheme, context-based adaptive variable length coding (CAVLC) is usable. The arithmetic coding transforms continuous data symbols into a single prime number. And, the arithmetic coding can obtain optimal prime bit required for representing each symbol. As the arithmetic coding, context-based adaptive binary arithmetic (CABAC) is usable.

Figure 2:
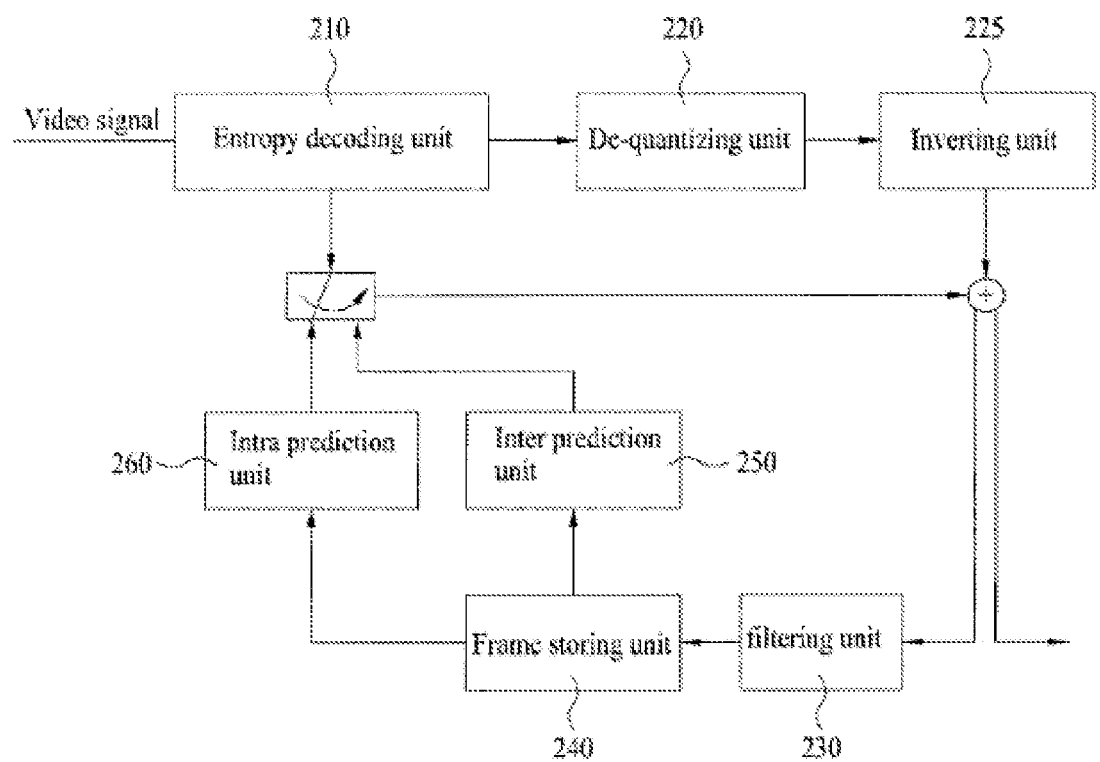
FIG. 2 is a schematic block diagram of an apparatus for decoding a video signal according to one embodiment of the present invention.

FIG. 2 is a schematic block diagram of an apparatus for decoding a video signal according to one embodiment of the present invention.

Referring to FIG. 2, a video signal decoding apparatus according to the present invention mainly includes an entropy decoding unit 210, a de-quantizing unit 220, an inverting unit 225, a filtering unit 230, a frame storing unit 240, an inter prediction unit 250, and an intra prediction unit 260.

The entropy decoding unit 210 extracts a transform coefficient, motion vector and the like of each macroblock by entropy-decoding a video signal bitstream. The de-quantizing unit 220 de-quantizes the entropy-decoded transform coefficient and the inverting unit 225 reconstructs an original pixel value using the de-quantized transform coefficient. Meanwhile, the filtering unit 230 is applied to each coded macroblock to reduce block distortion. A filter enhances an image quality of a decoded picture by smoothening edges of a block. The filtered picture is outputted or stored in the frame storing unit 240 to be used as a reference picture.

The inter prediction unit 250 predicts a current picture using the reference picture stored in the frame storing unit 240. In this case, as mentioned in the foregoing description, the reference picture is used. Moreover, the inter prediction unit 250 is able to use inter-picture prediction information (reference picture index information, motion vector information, etc.) forwarded from the entropy decoding unit 210.

Meanwhile, the intra prediction unit 260 performs intra-picture prediction from a decoded sample within a current picture. A prediction value outputted from the intra prediction unit 260 or the inter prediction unit 250 and a pixel value outputted from the inverting unit 225 are added together to generate a reconstructed video frame.

In the following description, the present invention proposes new various embodiments for decoding a video signal efficiently in the intra prediction unit 170 and the inter prediction unit 160 of the encoding apparatus and the intra prediction unit 260 and the inter prediction unit 250 of the decoding apparatus. First of all, first to fourth embodiments of the intra prediction units 170 and 260 are explained and fifth to ninth embodiments of the inter prediction units 160 and 250 are then explained. The first embodiment shall be explained with reference to FIGS. 3 to 6B, the second embodiment shall be explained with reference to FIGS. 7 to 8B, the third embodiment shall be explained with reference to FIGS. 7 to 8B, and the fourth embodiment shall be explained with reference to FIG. 11 and FIG. 12.

Figure 3:
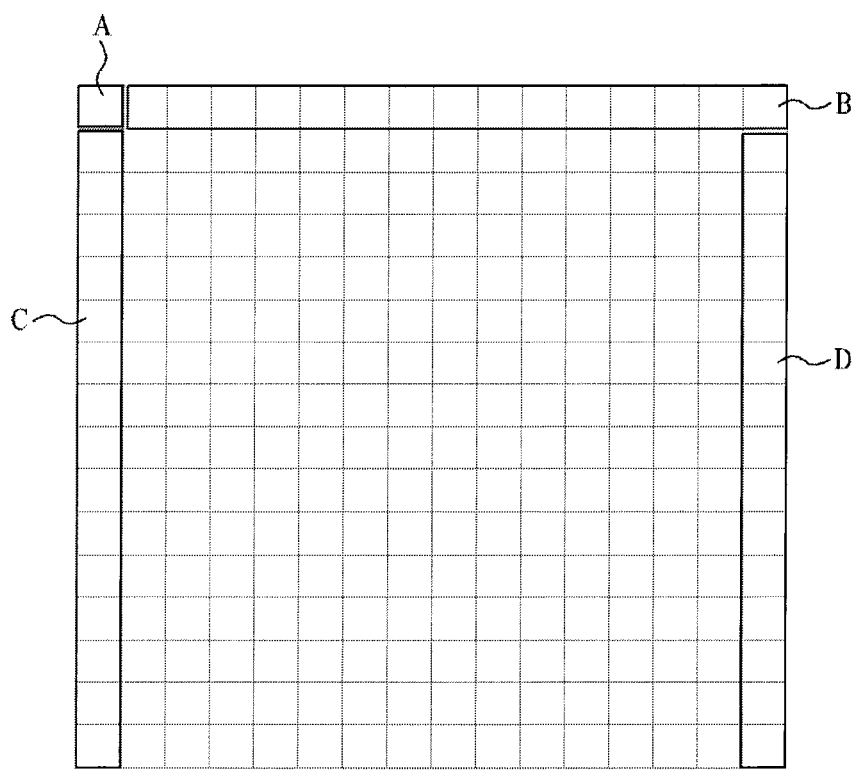
FIG. 3 is a diagram of a neighbor pixel area used in an extension prediction mode according to a first embodiment of the present invention.
Figure 4A:
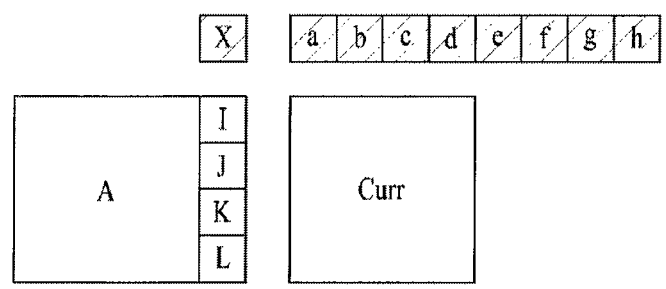
FIGS. 4A to 4C are diagrams of neighbor pixels interpolated to use an extension prediction mode according to a first embodiment of the present invention.
Figure 4B:
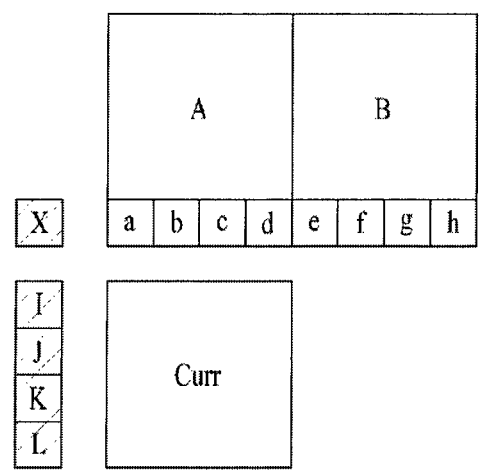
Figure 4C:
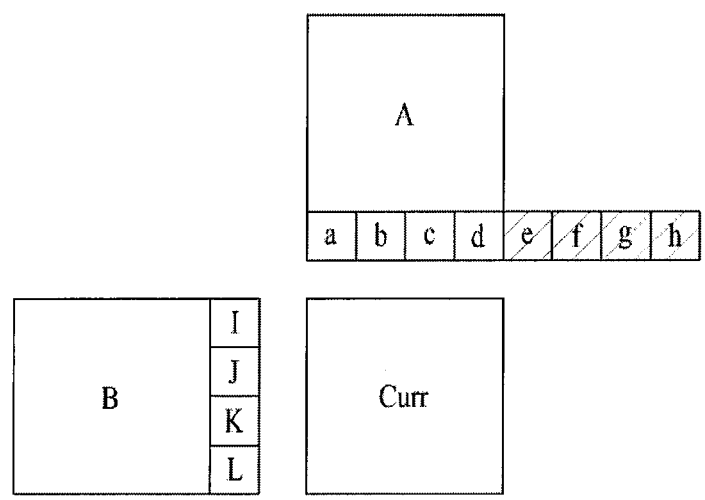
Figure 5:
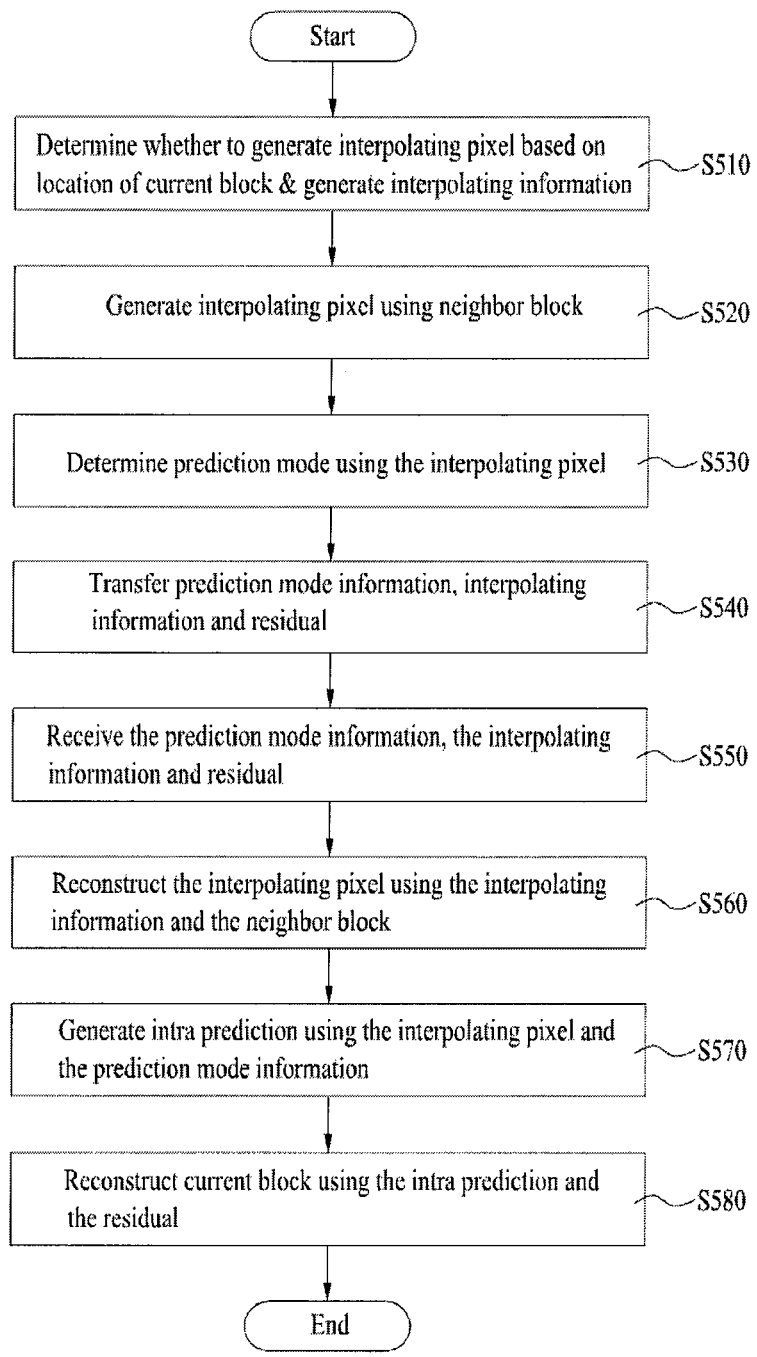
FIG. 5 is a flowchart for a video signal encoding/decoding sequence that adopts an extension prediction mode according to a first embodiment of the present invention.
Figure 6A:
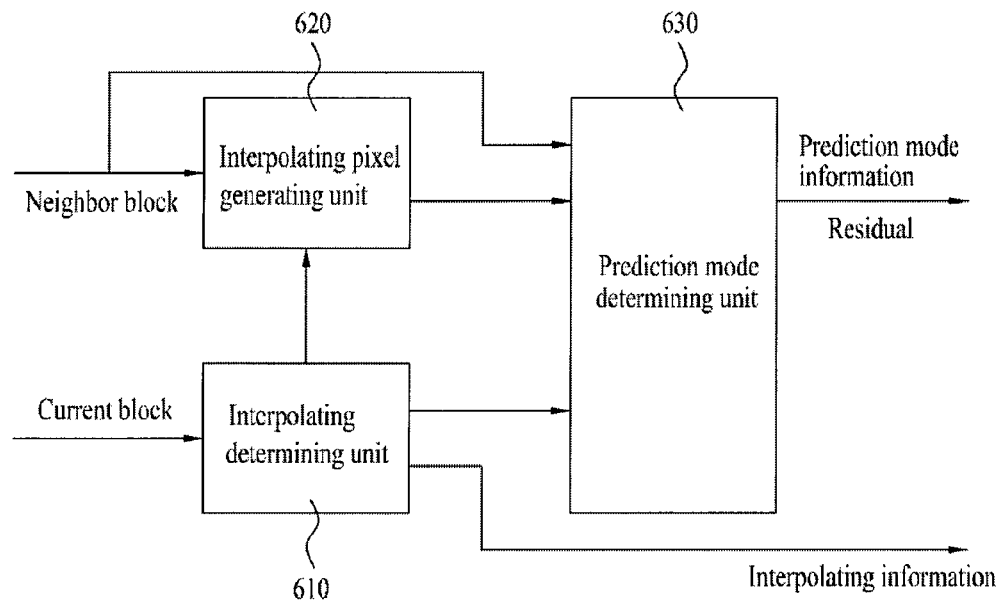
FIG. 6A and FIG. 6B are block diagrams of an intra prediction unit of an encoding/decoding apparatus according to a first embodiment of the present invention.
Figure 6B:
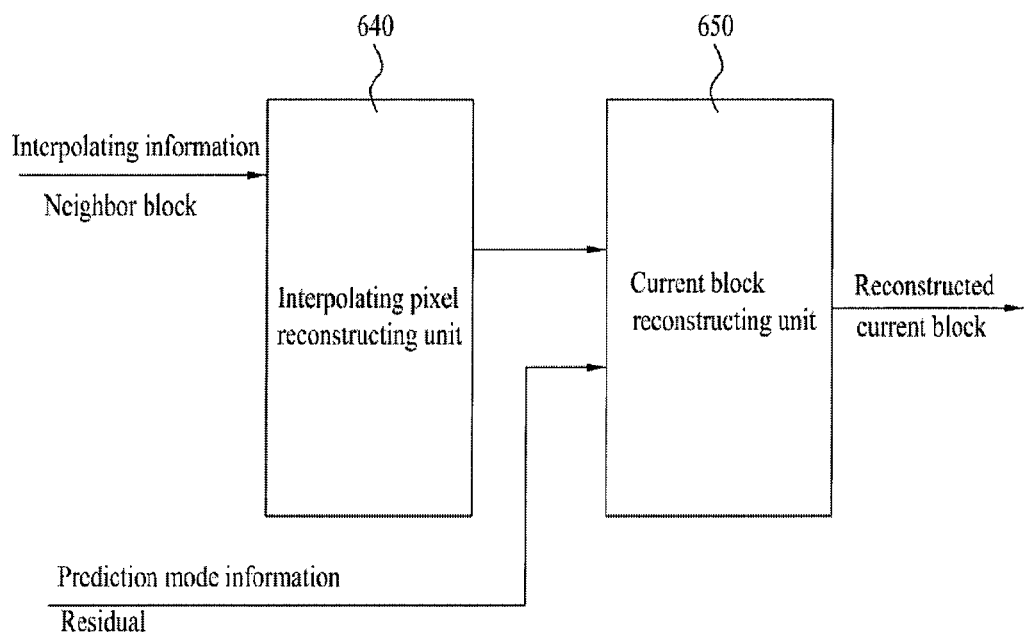

FIG. 3 is a diagram of a neighbor pixel area, for which an extension prediction mode is adopted, according to a first embodiment of the present invention, and FIGS. 4A to 4C are diagrams of neighbor pixels interpolated to use an extension prediction mode. FIG. 5 is a flowchart for a video signal encoding/decoding sequence that adopts an extension prediction mode. FIG. 6A shows a configuration of an intra prediction unit of a video signal encoding apparatus according to a first embodiment of the present invention, and FIG. 6B shows a configuration of an intra prediction unit of a video signal decoding apparatus according to a first embodiment of the present invention.

Referring to FIG. 3, a single frame can be constructed with a set of a plurality of intra-block units. The unit block can include an intra 4*4 block, an intra 8*8 block or an intra 16*16 block. Generally, an intra N*N block can perform intra prediction using nine kinds of prediction modes. The prediction mode performs prediction using four pixels located in a left side of a current block and eight pixels located at a top of the current block. Yet, in case that a current block is located on a boundary area, as shown in FIG. 3, a pixel used for intra prediction may not exist. This boundary area may correspond to one of a most left block (A) of an upper end portion, the upper end portion (B), a left side portion (C) and a right side portion (D).

For the most left block (A) in the upper end portion of the frame, it is able to adopt DC mode (mode 2) that uses a mean value among the nine kinds of prediction modes since neither a left pixel or a top pixel of a current block, which uses prediction, does not exist. For the upper end portion (B), prediction mode 1 (horizontal direction), mode (DC) and mode 8 (horizontal up direction) are usable since a top pixel of a current block does not exist. And, for the left side portion (C), mode 0 (vertical direction), mode 2 (DC), mode 3 (diagonal down left) and mode 7 (vertical left) are usable. And, a block corresponding to the right side portion (D) is able to six kinds of prediction modes except mode 3 (diagonal down left) and mode 7 (vertical left).

Thus, the blocks A, B, C and D located on the boundary area have limited prediction modes. In case that the entropy coding unit 180/210 performs VLC (variable length coding) on the blocks A, B, C and D, maximum four bits are unconditionally transferred. Therefore, bit loss is generated as many as empty prediction modes.

In the first embodiment of the present invention, if a current block is located on a boundary area (A, B, C, D), a step of interpolating an empty neighbor pixel using currently existing neighbor pixels is further included. Therefore, blocks located on the boundary area can use all the nine kinds of prediction modes without limitation. And, this prediction mode is named an extension intra prediction mode.

In order to use an extension intra prediction mode of the present invention, a method of interpolating a neighbor pixel of a block located on a boundary area is explained as follows.

First of all, if a current block is a most left block (A) of an upper end portion, different DC prediction values (predictors) are substituted for empty modes 0, 1, 3, 4, 5, and 7 and are then transmitted. For instance, the transmission is performed in a manner of substituting DC predictors 108, 118, 138, 148, 98, 88, 158 and 168 for Modes 0, 1, 3, 4, 5, 6 and 7, respectively as well as the DC predictor 128 provided to a current mode 2, thereby enabling a value having best coding efficiency and reconstruction ratio to be selected.

If a current block is located at an upper end portion (B), a left side portion (C) or a right side potion (D), interpolated neighbor pixels are shown in FIGS. 4A to 4C as follows.

FIG. 4A shows interpolated pixels in case that a current block is located at the upper end portion (B).

Referring to FIG. 4A, pixels I, J, K and L located left to a current block have existed as pixels belonging to a pixel A. Yet, pixels x and a to h above the current block fail to exist originally. Therefore, it is able to generate pixels by interpolating the above pixels x and a to h using the previously existing pixels I, J, K and L.

Various methods are available for interpolating the pixels x and a to h. For instance, the pixel I is usable by being intactly interpolated in the pixels x and a to h. And, a mean value of pixels I and J can be interpolated in the pixels x and a to h. For another instance, values of pixels I to L are intactly reflected on the pixels a to d and values of the pixels e to h and a mean value of the pixels I to L is interpolated in the pixel x. The method of interpolating the pixels x and a to h is not limited to the method of using the pixels I to L. The rest of pixels are usable for a reconstructed block A (i.e., block left to the current block), by which various methods are non-limited.

FIG. 4B shows interpolated pixels in case that a current block is located at the left side portion (C).

Referring to FIG. 4B, pixels a to h located above a current block have existed as pixels belonging to reconstructed blocks A and B. Yet, left pixels x and I to H fail to exist originally. Therefore, it is able to generate pixels by interpolating the left pixels x and I to L using the previously existing pixels a to h.

In order to generate the pixel x and the pixels I to L, the pixel a can be intactly interpolated in the pixel X and the pixels I to L to use. A mean value of the pixels a to d can be interpolated in the pixel x and the pixels I to L. A mean value of the pixels a to d is interpolated in the pixel x and the values of the pixels a to d can be intactly reflected on values of the pixels I to L. Yet, this interpolating method is non-limited to this. And, it is able to use the rest of pixels of the reconstructed blocks A and B.

FIG. 4C shows interpolated pixels in case that a current block is located at the right side portion (D).

Referring to FIG. 4C, pixels a to h and pixels I to H, which are located above a current block and left to the current block, have existed as pixels belonging to the reconstructed blocks A and B, respectively. Yet, pixels e to h above and right to the current block are the pixels failing to exist previously. Therefore, the pixels can be generated by interpolating the pixels e to h using the previously existing pixels a to h and the previously existing pixels I to L.

Various interpolating methods are usable to generate the pixels e to h. For instance, a mean value of the pixels a to d is usable as values of the pixels e to h, a mean value of the pixels I to L is usable as values of the pixels e to h, and a value of the pixel d is usable as values of the pixels e to h as well. Yet, this interpolating method is non-limited to this. And, it is able to use the rest of pixels of the reconstructed blocks A and B.

Referring to FIG. 5 and FIG. 6A, the intra prediction unit 170 of the video signal encoding apparatus includes an interpolating determining unit 610, an interpolating block generating unit 620 and a prediction mode determining unit 630.

First of all, if information on a current block is inputted, the interpolating determining unit 610 determines whether the current block corresponds to a boundary area (most left block in a screen upper end portion, upper end portion or right end portion) and then determines whether to perform interpolating. Whether the current block corresponds to a boundary area is determined based on position information of the current block [S510]. For instance, a position of the current block can be obtained using a value of a pixel configuring the current block.

Meanwhile, in case of determining to perform the interpolating is determined, the interpolating determining unit 510 generates interpolating information indicating whether a neighbor pixel of the current block is generated using the interpolating and then enables the interpolating information to be included in a bitstream. The interpolating information can indicate that the current block is located at a prescribed position in the boundary area or whether the interpolating is performed. For instance, the interpolating information can exist as a flag.

If it is determined that that the current block corresponds to the boundary area using the position information of the current block, the interpolating pixel generating unit 620 receives an input of information on the neighbor block and the current block and then generates an interpolating pixel using pixels of the neighbor block [S520]. A method for the interpolating block generating unit 620 to generate the interpolating pixel failing to exist previously is as good as the aforesaid method explained with reference to FIGS. 4A to 4C.

If the interpolating determining unit 610 determines that the current block is not located on the boundary area, as all neighbor pixels for intra prediction of the current block exist, the information on the current block is inputted to the prediction mode determining unit 630.

By performing the interpolating, after all the neighbor pixels of the current block have been generated, the information on the neighbor blocks is inputted to the prediction mode determining unit 630. The prediction mode determining unit 630 performs nine kinds of intra predictions of the current block using the interpolated neighbor pixels and then determines a prediction mode [S530]. The prediction mode determining unit 630 generates a residual that is a difference between a block (predictor) predicted according to the determined prediction mode and the current block, enables the prediction mode information, the residual and the formerly generated interpolating information to be included in a bitstream, and then transports the bitstream to the decoding apparatus [S540].

Referring to FIG. 5 and FIG. 6B, the decoding apparatus (in particular, the entropy decoding unit thereof) receives the prediction mode information, the interpolating information and the residual [S550].

Subsequently, an interpolating block reconstructing unit 640 of the intra prediction unit 260 of the decoding apparatus reconstructs the interpolating block using the received interpolating information and the neighbor block [S560]. A step of reconstructing the interpolating block in the decoding apparatus is identical to the description with reference to FIGS. 4A to 4C.

A current block reconstructing unit 650 generates intra prediction of the current block using the interpolating block generated in the step S560 and the prediction mode received in the step S550 [S570] and then reconstructs the current block using the intra prediction and the received residual [S580].

Thus, the first embodiment of the present invention interpolates a neighbor pixel and then uses the interpolated neighbor pixel for intra prediction of a current block. Therefore, even if the current block is located on a boundary area, it is advantageous in coding the current block using intra prediction.

A second embodiment of the present invention proposes a new intra prediction mode for reconstructing a plurality of blocks constructing a current frame by a pixel unit simultaneously, which differs from the reconstruction in zigzag direction by a block unit in reconstructing a current frame using intra prediction. In particular, instead of performing intra prediction on a block located at a left upper end portion of a current frame and then performing intra prediction on a right block, intra prediction is sequentially performed on a plurality of blocks constructing a current frame in preset order. This intra prediction method of a current frame is named a frame-pixel prediction mode and will be explained in detail with reference to FIGS. 7 to 8P.

FIG. 7 is a flowchart of a sequence for performing a frame-pixel prediction mode according to a second embodiment of the present invention.

Referring to FIG. 7, in case that a current frame adopts a frame-pixel prediction mode, a current block predicts a first pixel of the current block using a neighbor block located in a previous frame that was reconstructed in advance [S710]. In this case, the first pixel of the current block intra-predicted in the first place may be the pixel located at a most right lower end portion of the current block, by which various examples of the first pixel are non-limited.

Subsequently, intra prediction of an adjacent pixel is performed using the first pixel and pixel prediction information and a residual are then generated [S720]. In this case, the pixel prediction information (hereinafter abbreviated DPI) can include at least one selected from the group consisting of a prediction pixel (predictor) used for intra prediction of the adjacent pixel, a prediction method and a prediction direction. The residual is the difference between a pixel predicted according to the pixel prediction method and a current pixel and can be generated by a pixel unit.

Once the intra prediction of the adjacent pixel is performed, each of the intra prediction unit 170 of the encoding apparatus 100 and the intra prediction unit 260 of the decoding apparatus according to the present invention determines whether the intra prediction of the current block has completed [S730]. If the intra prediction is completed, the pixel prediction information (PPI) and residual generated in the step S702 are transferred [S740].

On the contrary, if the intra prediction of the current block is not completed, the step of predicting an adjacent pixel using the previously predicted pixels and generating pixel prediction information (PPI) and residual is repeated. In this case, adjacent pixels, which are predicted using the prediction-completed pixel, are named second pixel, third pixel . . . and $N^{th}$ pixel in order of prediction, respectively. A method of performing intra prediction of the first to $N^{th}$ pixels will be explained in detail with reference to FIGS. 8A to 8P later.

The inter prediction unit 260 of the decoding apparatus according to the second embodiment of the present invention receives the pixel prediction information (PPI) and the residual [S750] and then reconstructs the first pixel of the current block using the received pixel prediction information (PPI) and the received residual [S760]. The residual used for the reconstruction of the first pixel includes a difference between a pixel located in a previous frame and the first pixel, which differs from other pixels.

Subsequently, using the reconstructed first pixel, the pixel prediction information and the residual, the second pixel is reconstructed [S770]. It is then determined whether the reconstruction of the current block is completed [S780]. If the reconstruction is not completed, the third pixel is reconstructed using the reconstructed first pixel, the reconstructed second pixel, the pixel prediction information and the residual. This is repeated until the reconstruction of the current block is completed. A method of predicting and reconstructing a current block in the intra prediction unit 170/260 of the encoding/decoding apparatus according to the second embodiment of the present invention will be explained with reference to FIGS. 8A to 8P.

Figures 8A, 8B:
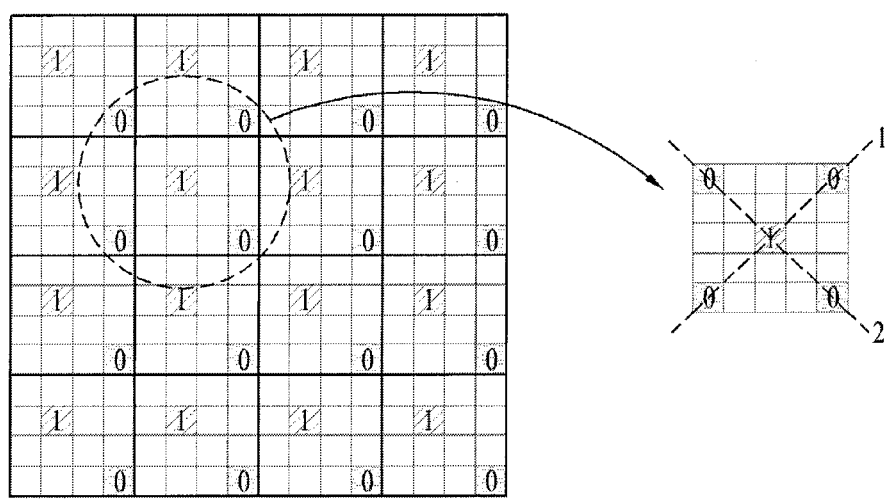
FIGS. 8A to 8P are diagrams for a method of predicting and reconstructing a current block in an intra prediction unit of an encoding/decoding apparatus according to a second embodiment of the present invention.

Frame-pixel intra prediction mode according to the second embodiment of the present invention, as shown in FIG. 8A, firstly intra-predicts a first pixel (i.e., pixel 0 shown in FIG. 8A) located at a most right lower end portion in a current block using pixels located in a previous frame. In doing so, it is able to use all nine kinds of prediction modes of the related art to predict the first pixel. As soon as the intra prediction is performed, the intra prediction unit 170 of the encoding apparatus generates pixel prediction information (PPI) and residual. The pixel prediction information of the first pixel may include pixels (predictors) of the previous frame used for pixel prediction. A prediction method may include a prediction mode having best efficiency among the nine kinds of prediction modes. And, the residual may be the difference between the first pixel and the pixels used for the prediction of the first pixel.

Intra prediction of a second pixel can be performed using the first pixel (0). The frame-pixel prediction mode according to the second embodiment of the present invention uses the following two kinds of methods as intra prediction mode of the second to $N^{th}$ pixels (except the first pixel), by which examples of the intra prediction mode are non-limited.

The first method is an averaging mode for prediction using a mean value of adjacent pixels. And, the second method is a directional mode for prediction according to directionality. In particular, the first method performs intra prediction of a current block using a mean value of pixels most adjacent t the current pixel to perform intra prediction thereon as a prediction pixel (predictor). The second method calculates a difference between two pixels closest to a current pixel in each of eight kinds of possible directions centering on the current pixel and then determines the direction having the smallest difference as a prediction direction. Using a mean value of two pixels closest to the current pixel in the selected prediction direction as a prediction pixel (predictor) of the current pixel, intra prediction of the current pixel is performed. As soon as the intra prediction is performed, pixel prediction information and residual are generated as well.

Referring to FIG. 8B, intra prediction of a second pixel (a) can be performed using a mean value of first pixels (0). A difference between the first pixels (0) located in a first direction (omitted due to the same calculated value of a second direction) centering on the second pixel (1) is calculated. Intra prediction is then performed using the mean value of the first pixels (0) as a prediction pixel. As soon as the intra prediction is performed, pixel prediction information and residual are generated as well.

Figure 8C:
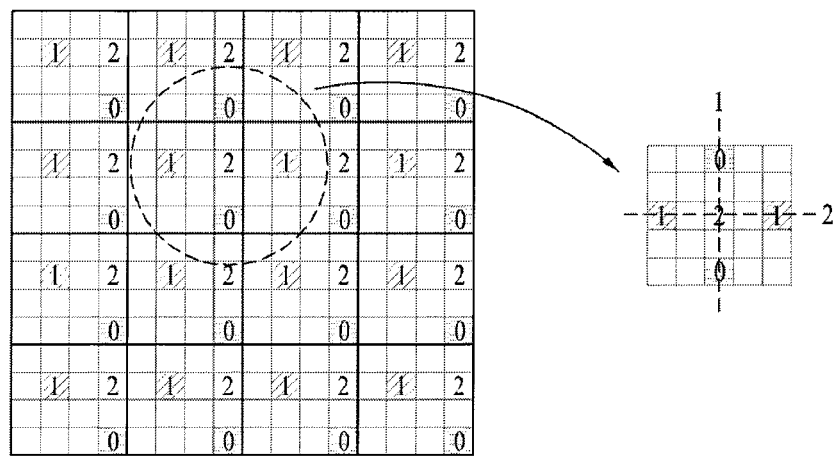

Referring to FIG. 8C, intra prediction of a third pixel (2) is performed using the first pixel (0) and the second pixel (1), of which neighbor predictions are completed, as prediction pixels (predictors) of the third pixel (2). The third pixel (2), as shown in FIG. 8C, is able to use a mean value between the first pixel (0) and the second pixel (1) adjacent to the third pixel (2) as a prediction pixel. Alternatively, a prediction direction is determined by finding a difference between pixels close thereto in first or second direction shown in FIG. 8C. A mean of two second pixels (two first pixels (0) in case of selecting the first direction or two second pixels (1) in case of selecting the second direction) close thereto in the prediction direction can be then used as a prediction pixel. As soon as the intra prediction is performed, pixel prediction information and residual are generated as well.

Figure 8D:
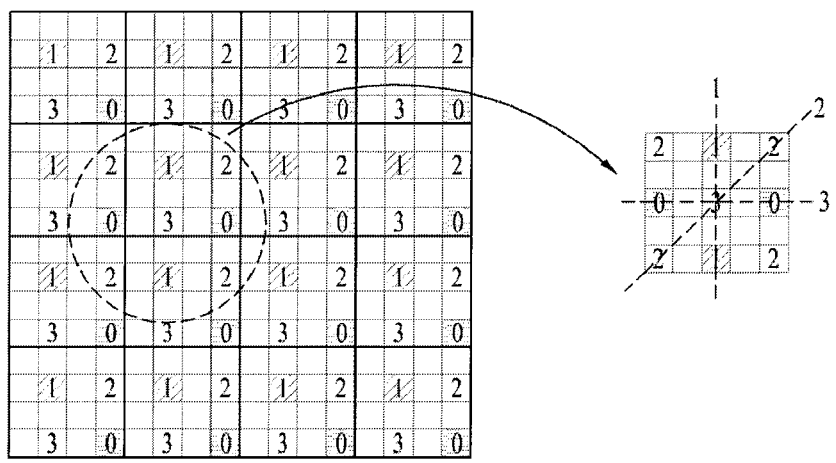

Referring to FIG. 8D, intra prediction of a fourth pixel (3) is performed using the first pixel (0) to the third pixel (2), of which predictions are completed, as prediction pixels (predictors) of the fourth pixel (3). The fourth pixel (3), as shown in FIG. 8D, is able to use a mean value of the first pixels (0), the second pixels (1) or the third pixels (2) adjacent to the fourth pixel (3) as a prediction pixel. Alternatively, a prediction direction (e.g., second direction) is determined by finding a difference between pixels close thereto in each of first to third directions shown in FIG. 8D, (e.g., a difference between two second pixels (1) in the first direction) and then comparing the found differences to each other. A mean of two pixels (third pixels (2)) close thereto in the prediction direction (second direction) can be used as a prediction pixel. As soon as the intra prediction is performed, pixel prediction information and residual are generated as well.

Figure 8E:
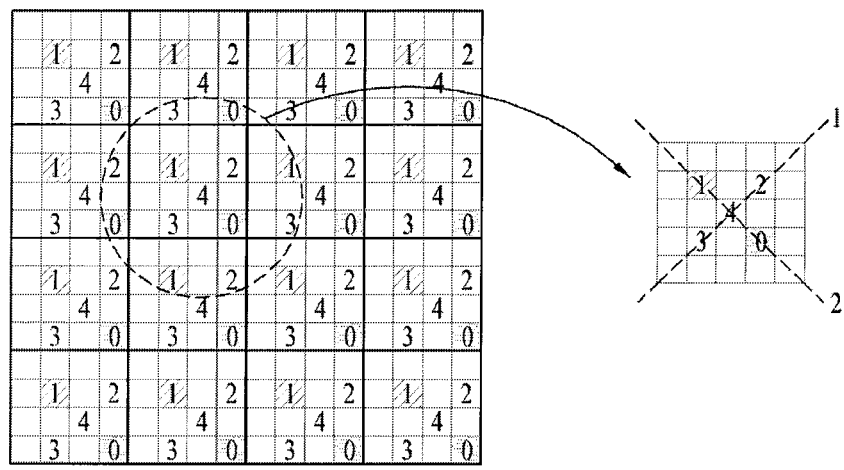
Figure 8F:
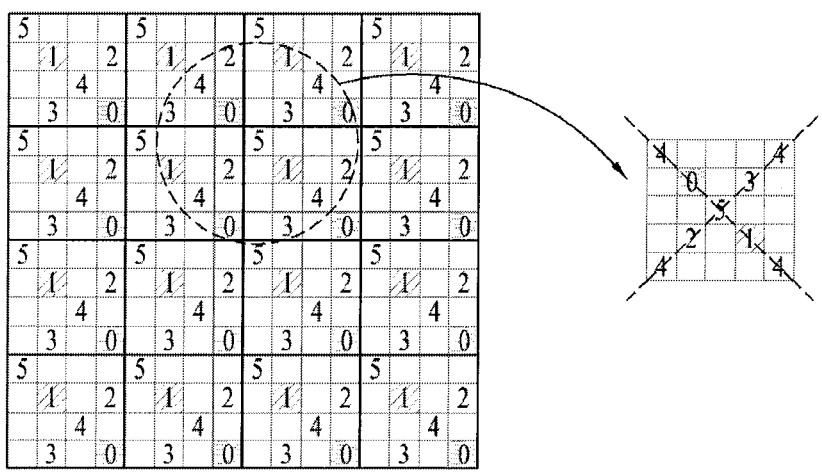
Figure 8G:
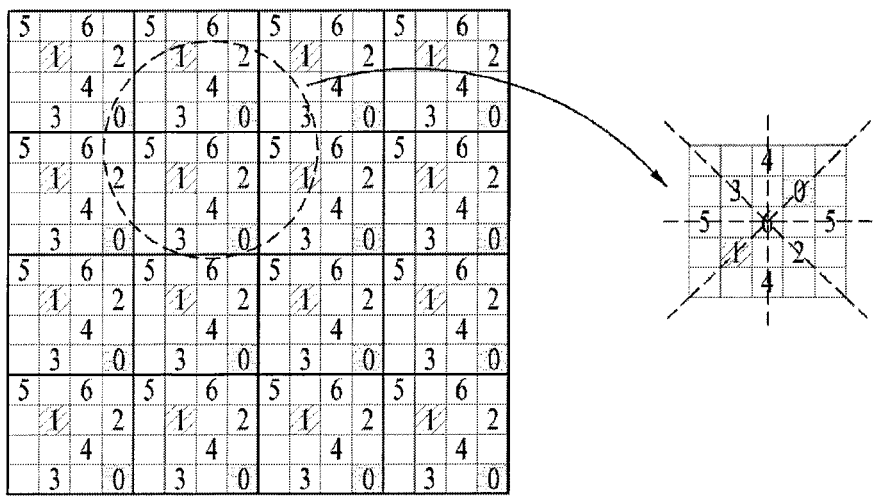
Figure 8H:
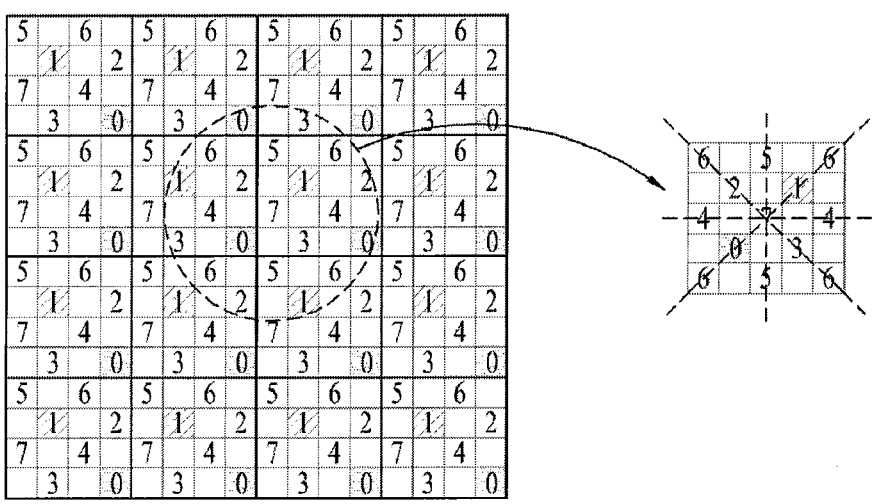
Figure 8I:
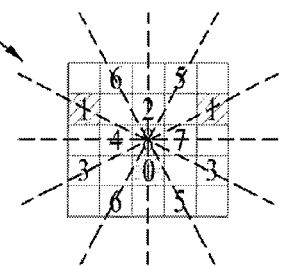
Figure 8J:
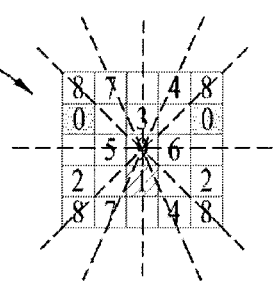
Figure 8K:
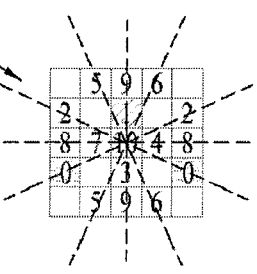
Figure 8L:
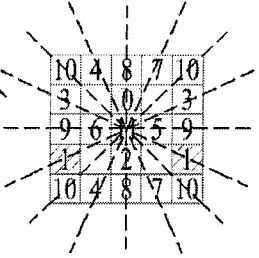
Figure 8M:
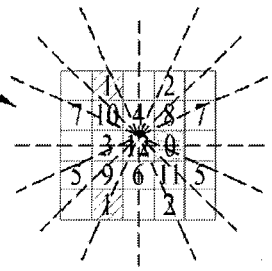
Figure 8N:
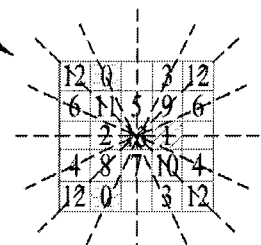
Figure 8O:
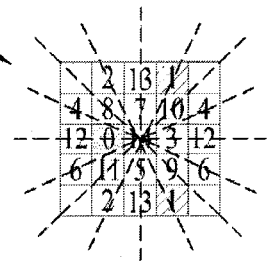
Figure 8P:
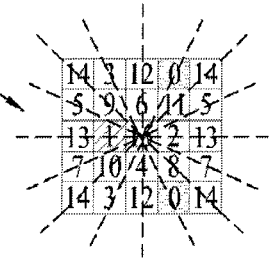

Referring to FIG. 8E, intra prediction of a fifth pixel (4) is performed using the first pixel (0) to the fourth pixel (3), of which predictions are completed, as prediction pixels (predictors) of the fifth pixel (4). The fifth pixel (4), as shown in FIG. 8E, is able to use a mean value of the first pixels (0), the second pixels (1) or the third pixels (2) adjacent to the fifth pixel (4) as a prediction pixel. Alternatively, a prediction direction is determined by finding a difference between pixels close thereto in each of first and second directions shown in FIG. 8E, and then comparing the found differences to each other. A mean of two pixels close thereto in the determined prediction direction can be used as a prediction pixel.

For instance, referring to FIG. 8E, a difference between two pixels is found in the first direction including the third pixel (2) and the fourth pixel (3). And, a difference between two pixels is found in the second direction including the first pixel (0) and the second pixel (1). The found differences are compared to each other. The direction having a smaller value of the two is determined as a prediction direction. If the first direction is selected as the prediction direction, a prediction pixel (predictor) for intra prediction of the fifth pixel (4) may correspond to a mean of the first and fourth pixels (2) and (3) adjacent to the fifth pixel (4) in the first direction. As soon as the intra prediction is performed, pixel prediction information and residual are generated as well.

By the above-explained methods, as shown in FIGS. 8F to 8P, it is able to perform intra predictions on a sixth pixel (5) to a sixteen pixel (15) using the prediction-completed neighbor pixels. As soon as the intra prediction is performed, pixel prediction information relevant to each pixel and residual can be generated as well.

Whenever intra prediction of each of the first to $N^{th}$ pixels is performed and the pixel prediction information on each of the pixels and the corresponding residual are generated, it is determined whether intra prediction of a current block is completed. If the intra prediction of the current block is completed, the pixel prediction information and residuals relevant to the first to $N^{th}$ pixels are transferred.

The intra prediction unit 270 of the video signal decoding apparatus of the present invention receives the pixel prediction information and residuals relevant to the first to $N^{th}$ pixels and then performs reconstruction of the current block. In particular, the intra prediction unit 270 reconstructs the first pixel of the current block using the received pixel prediction information and residual relevant to the first pixel and then reconstructs the second pixel of the current block using the reconstructed first pixel and the received pixel prediction information and residual relevant to the second pixel. In this manner, reconstructions are sequentially performed on the pixels of the current block up to the Nth pixel to complete the reconstruction of the current block.

Thus, the video signal decoding method according to the second embodiment of the present invention enables more accurate prediction in a manner that a current block uses adjacent pixels of a current block for intra prediction as well as pixels of a neighbor block. Moreover, since adjacent pixels are predicted using predictor values selected from at least two directions, a block having a coefficient of more zeros is generated in case of discrete cosine transform. Therefore, the video signal decoding method according to the second embodiment of the present invention is advantageous in raising coding efficiency.

A third embodiment of the present invention proposes an intra skip mode that uses an intact pixel value of a neighbor block in performing intra prediction on a current block instead of performing prediction from a neighbor block in a specific case.

Figure 9:
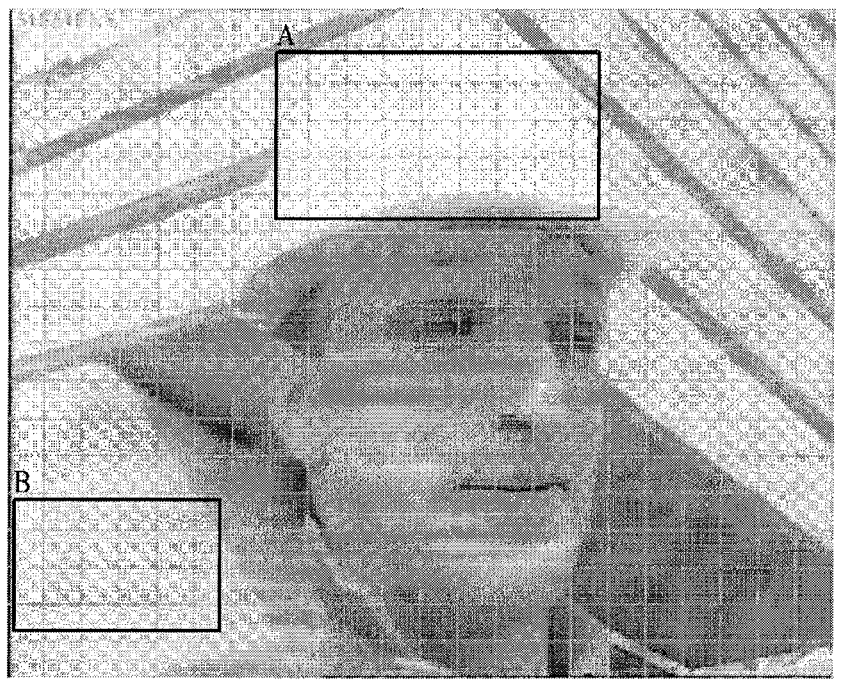
FIG. 9 is a diagram of a video picture according to a third embodiment of the present invention.
Figure 10:
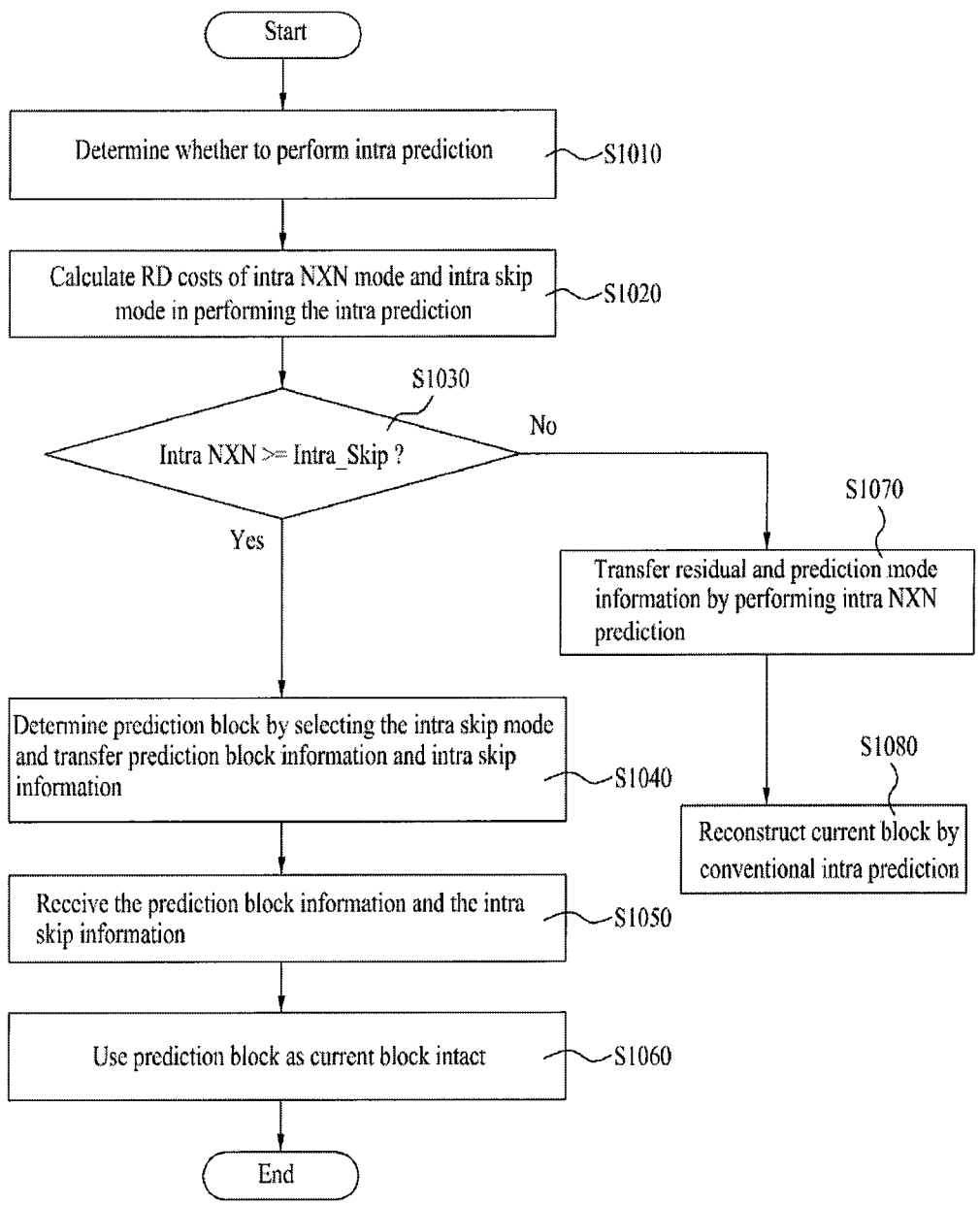
FIG. 10 is a flowchart of a video signal encoding/decoding sequence according to a third embodiment of the present invention.

FIG. 9 is a diagram of a video picture according to a third embodiment of the present invention, and FIG. 10 is a flowchart of a video signal encoding/decoding sequence according to a third embodiment of the present invention.

According to a related art, intra prediction uses 16*16 block, 8*8 block and 4*4 block and is performed using nine kinds of intra prediction modes. Yet, when an intra prediction mode is used due to reduced inter-picture correlation, if a current block is homogeneous to a neighbor block, using the neighbor block intact may be more efficient than performing the related art intra prediction.

Referring to FIG. 9, assume that inter prediction is not available due to reduced correlation of a box A appearing on a hat shown in FIG. 9 or a box B left to a face with a previous picture. In this case, intra prediction is performed. Since blocks within a box are homogeneous, a pixel value of a neighbor block is used as a pixel value of a current block as it is. And, using an intra skip mode may be efficient instead of performing intra prediction separately. In this case, it is understood that prediction mode information and residual are not transferred.

Referring to FIG. 10, first of all, a current block determines whether to perform intra prediction or inter prediction [S1010]. In this case, the step of determining the intra or inter prediction of the current block is performed in the same manner of the related art.

Once the step S101 determines that the current block performs the intra prediction, an intra skip mode can be adopted only if the current block has the efficiency better than that of the case that the current block performs the related art intra prediction.

The current block calculates an RD cost of the case of using an intra prediction mode and an RD cost of the case of using an intra skip mode [S1020]. In this case, the RD cost (hereinafter called efficiency) is calculated as Formula 1.

$$J = D + \lambda R \qquad \text{[Formula 1]}$$

In Formula 1, 'D' is a sum of square distortion (SSD) and 'R' is a required bit number.

After the efficiencies have been calculated, if the case for the current block to use the intra skip mode has better efficiency, the intra skip mode is selected ['yes' in the step S1030], a prediction block is determined, and intra skip information and selected prediction block information are then transferred [S1040]. In this case, the intra skip information can include flag information (intra_Skip_flag) indicating whether the current block uses the intra skip mode.

The intra prediction unit 260 of the decoding apparatus according to the present invention receives the intra skip information and the prediction block information [S1050]. If the intra skip information is in a format of flag information, the meaning of the intra skip mode flag information is represented as Table 1.

TABLE 1

| Separate intra prediction flag (intra_skip_flag) | Meaning |
| --- | --- |
| 0 | Perform intra prediction mode of the related art |
| 1 | Perform intra skip mode |

If the received intra skip mode flag information (intra_skp_flag) is set to 1, the intra prediction unit 260 of the decoding apparatus according to the present invention intactly uses a pixel value of a prediction block as a pixel value of the current block according to the prediction block information [S1060].

On the contrary, if it is determined that the current block uses the intra prediction mode ['no' in the step S1030], intra N*N prediction is performed and residual and prediction mode information are transferred [S1070].

Moreover, the intra prediction unit 260 of the decoding apparatus according to the present invention receives the residual and prediction mode information and then reconstructs the current block using the related art intra prediction method [S1080].

Thus, in case that an intra skip mode is used for intra prediction of a current block according to the third embodiment of the present invention, prediction and reconstruction of a video signal, of which inter prediction is inefficient but which is homogeneous to a neighbor block, can be efficient. It is unnecessary to perform intra prediction. And, it is also unnecessary to transfer residual and CBP. Therefore, a used bitrate can be lowered.

A frame for performing intra prediction is coded into intra 16*16 block, intra 8*8 block and intra 4*4 block. In each mode, a specific block is predicted using a previously reconstructed block located above the specific block and a previously reconstructed block located left to the specific block. In particular, a mode of using intra 4*4 block is used in a high frequency region. For intra prediction of a current block, prediction blocks (predictors) are restricted to use the blocks located above and left to the current block only. This is not insufficient for prediction and reconstruction of the current block. If the current block is located on a boundary, this is inefficient. Therefore, using a block to be reconstructed next as well as a previously reconstructed block for prediction of a current block enables more accurate prediction.

To solve this problem of the intra prediction mode, a fourth embodiment of the present invention proposes a separate intra prediction mode that is a new intra prediction method of a current frame including a current block. As a single intra frame can be divided into tow or four independent subframes, various separate intra prediction modes can exist in a separated frame. Unlike consecutive frames having a motion, high redundancy exists between subframes for moving sub-pixels. Therefore, a separate intra prediction mode in a subframe of intra frame can be considerably efficient.

Figure 11:
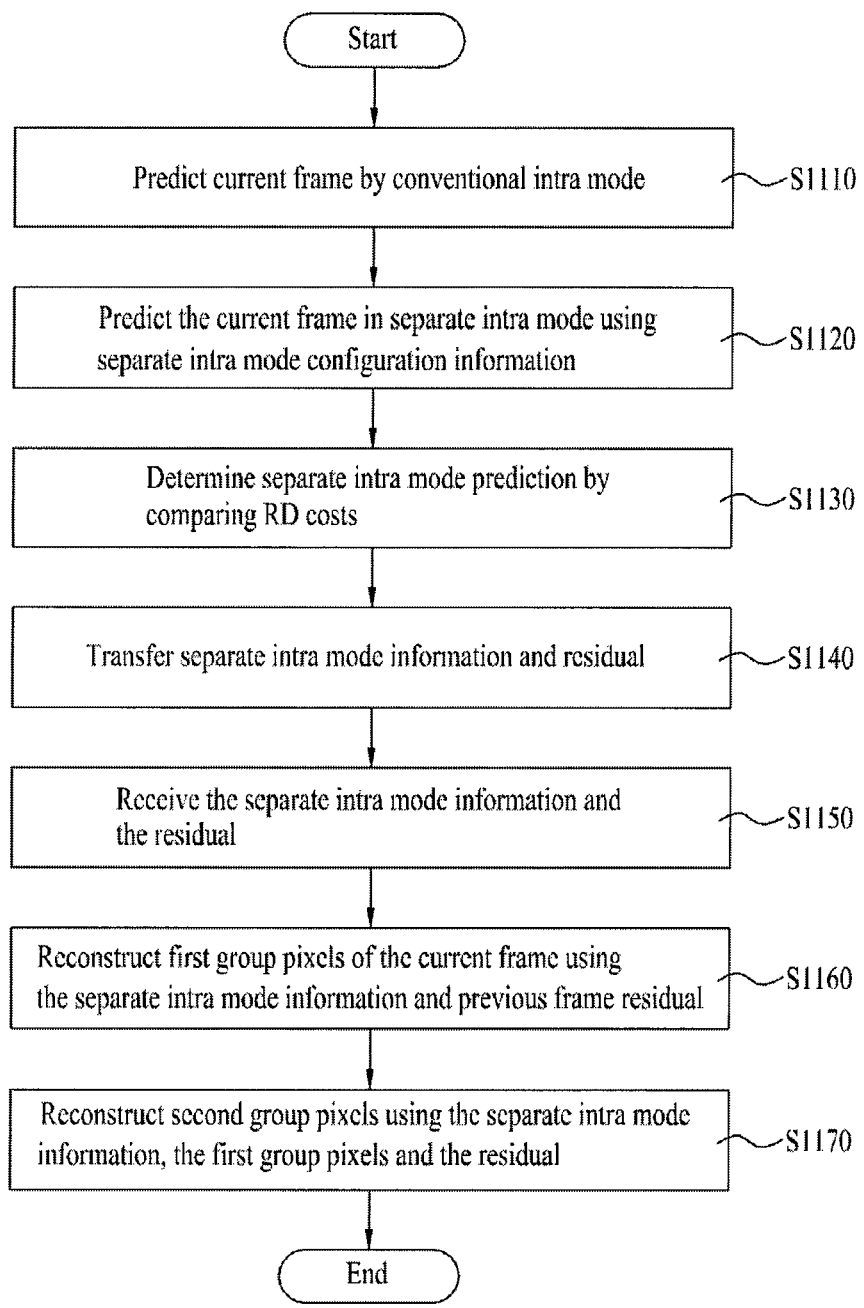
FIG. 11 is a flowchart of a video signal encoding/decoding sequence according to a fourth embodiment of the present invention.
Figure 12A:
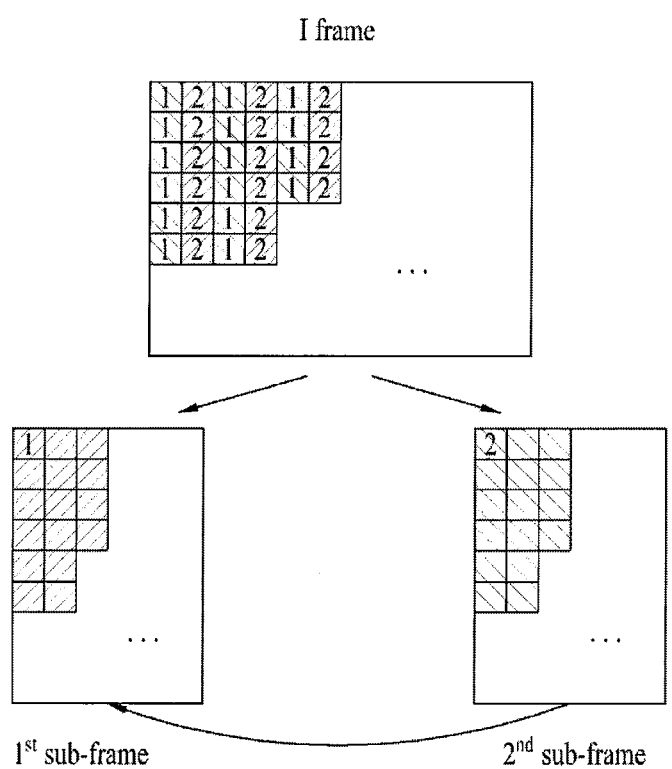
FIGS. 12A to 12C are exemplary diagrams of blocks indicating a separate intra prediction mode according to a fourth embodiment of the present invention.
Figure 12B:
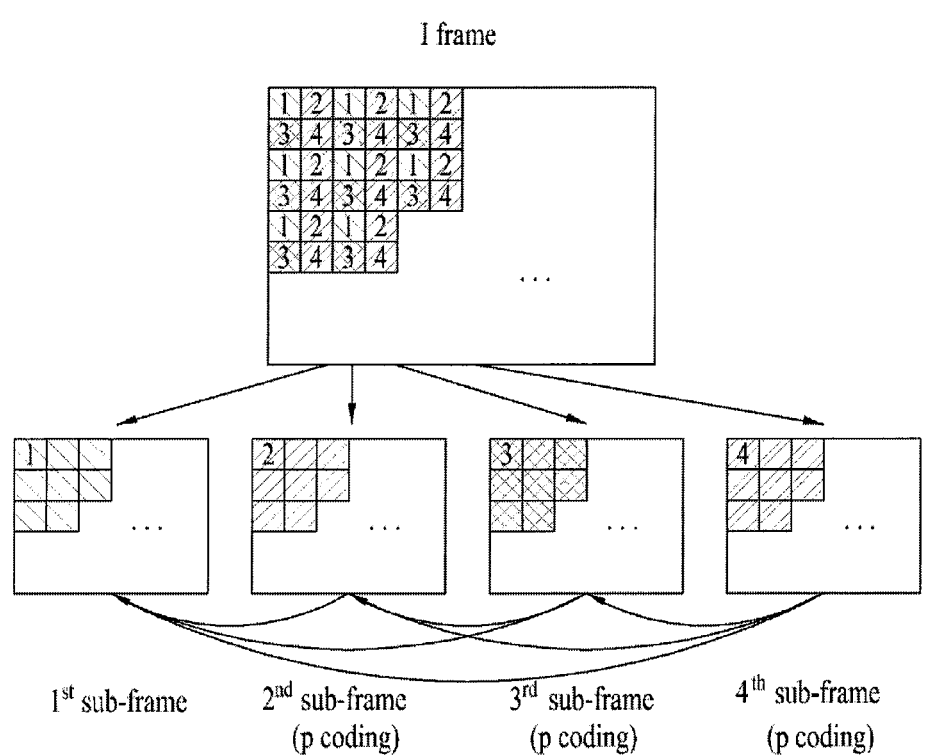
Figure 12C:
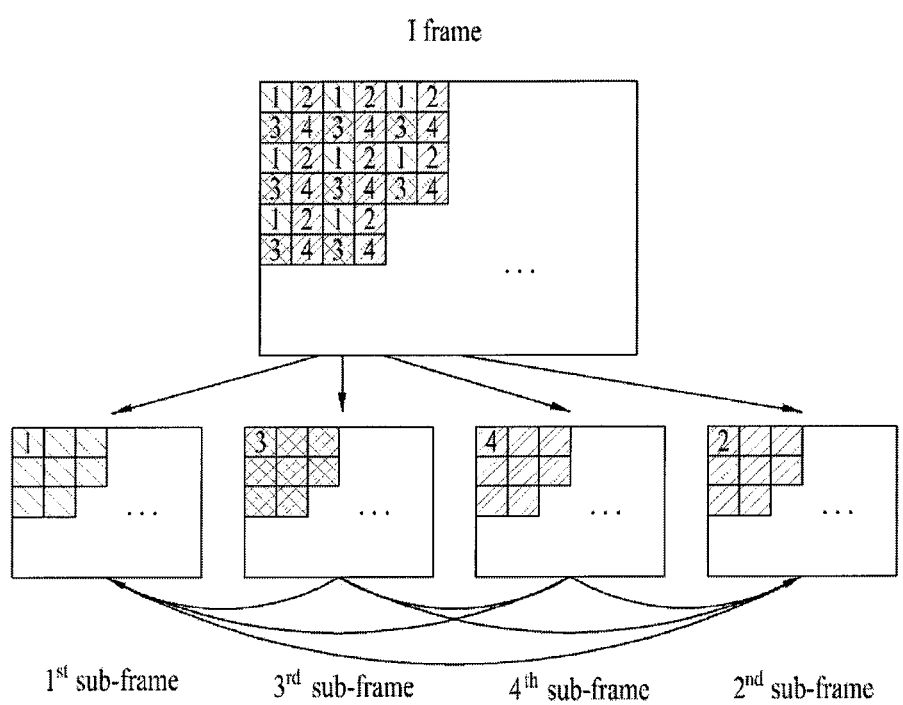

FIG. 11 is a flowchart of a video signal encoding/decoding sequence according to a fourth embodiment of the present invention, and FIGS. 12A to 12C are exemplary diagrams of blocks indicating a separate intra prediction mode according to a fourth embodiment of the present invention.

Referring to FIG. 11, the intra prediction unit 170 of the encoding apparatus according to the present invention calculates an RD cost by performing the related art intra prediction on a current frame [S1110]. And, the intra prediction unit according to a fourth embodiment of the present invention receives an input of separate intra mode structure information (SIMSI). The separate intra mode structure information (SIMSI) includes a type of subframe and a structure of separate intra mode. The type of the subframe may include a plurality of 16*16, 8*8 or 4*4 blocks, a single 16*16, 8*8 or 4*4 block, or a single or a plurality of pixel units, by which examples of the present invention are non-limited. The structure of the separate intra mode can include IP structure, IPPP structure or IBBP structure, which will be explained in detail with reference to FIGS. 12A to 12C later.

After the related art intra prediction has been performed on the current frame, the separate intra prediction of the current frame according to the structure of the separate intra mode is performed using the separate intra mode structure information (SIMSI) [S1120].

In case of the related art intra prediction and the separate intra mode prediction for the current frame, RD costs are calculated. If the efficiency (RD cost) of the separate intra mode prediction is better than the other, the separate intra mode prediction is selected [S1130].

Subsequently, separate intra mode information (hereinafter abbreviated SIDI) including the type of the selected separate intra mode and the separate intra mode structure and a residual between a block (predictor) used for prediction and a current block are transferred [S1140]. And, it is also able to transfer separate intra prediction flag information (separate_intra_prediction_flag) indicating whether the separate intra prediction mode is selected.

If the separate intra prediction flag information is transferred from the encoding apparatus, the intra prediction unit 260 of the decoding apparatus according to the present invention receives the separate intra prediction flag information. And, the meaning of the separate intra prediction flag information is represented as Table 2.

TABLE 2

| Separate intra prediction flag (separate_intra_skip_flag) | Meaning |
| --- | --- |
| 0 | Perform intra prediction mode of the related art |
| 1 | Perform separate intra prediction mode |

If the separate intra prediction flag is set to 0, the related art intra prediction mode is performed for reconstruction of the current frame. If the separate intra prediction flag is set to 1, the separate intra prediction mode is performed. Hence, the separate intra mode information (SIMI) and the residual are received [S1150]. And, a first subframe group of the current frame is reconstructed using the separate intra mode information (SIMI), the residual and a previous frame [S1160]. Moreover, a second subframe group is reconstructed using the separate intra mode information (SIMI), the residual and the first subframe group [S1170].

If the selected separate intra mode structure is the IPPP structure, a third subframe group is reconstructed using the separate intra mode information, the residual, the first subframe group and the second subframe group. And, a fourth subframe group is reconstructed using the separate intra mode information, the residual, the first subframe group, the second subframe group and the third subframe group.

If the selected separate intra mode structure is the IBBP structure, a third subframe group is reconstructed using the separate intra mode information, the residual, the first subframe group and the second subframe group. And, a fourth subframe group is reconstructed using the separate intra mode information, the residual, the first subframe group and the second subframe group.

In the following description, a method of predicting a separate intra prediction mode according to a separate intra mode structure is explained with reference to FIGS. 12A to 12C.

Referring to FIG. 12A, a current frame (I frame) can be divided into a first subframe and a second subframe by a subframe unit and can be located by an interlace scanning scheme. If the current frame is divided into equal parts, the left part corresponds to the first subframe and the right part corresponds to the second subframe. This non-limits various examples of the present invention. The first and second subframes can be alternately arranged as shown in FIG. 12A. A set of these first subframes is named a first subframe group and a set of these second subframes is named a second subframe group.

First of all, the first subframe group can be coded using the related art intra prediction mode and the second subframe group can be coded using intra prediction within a current frame with reference to the first subframe group.

FIG. 12B shows IPPP structure and IPPP prediction method in separate intra prediction mode. A current frame can be divided into total four kinds of subframes. And, sets of the four kinds of the subframes can include first to fourth subframe groups, respectively.

Referring to FIG. 12B, the first subframe group is coded by performing prediction using the related art intra prediction mode. Subsequently, the second subframe group is coded by performing intra prediction using the first subframe group. The third subframe group performs intra prediction using the first and second subframe groups. And, the fourth subframe group performs intra prediction using the first to third subframe groups.

FIG. 12C shows IBBP structure and IBBP prediction method in separate intra prediction mode. Like FIG. 12B, a current frame can be divided into total four kinds of subframes.

Referring to FIG. 12C, in the IBBP prediction method, a first subframe group performs intra prediction using the related art intra prediction mode, a second subframe group performs intra prediction using the first subframe group, a third subframe group performs intra prediction using the first and second subframe groups, and a fourth subframe group performs intra prediction using the first and second subframe groups.

In this case, the arranged sequences of subframes in the separate intra prediction mode are not limited to those shown in FIGS. 12A to 12C. And, various sequences are selectable. Moreover, the structure and the prediction method, as mentioned in the foregoing description, can be included in the separate intra mode information.

Thus, in case of using a separate intra prediction mode according to the fourth embodiment of the present invention, a prediction block is not limited to the block located above or left to the prediction block, whereby accurate prediction of a current frame is possible.

A method of decoding a video signal according to the present invention proposes new modes for high efficiency regarding motion vector estimation and compensation as well as a new intra prediction mode.

In the following description, fifth to ninth embodiments of the inter prediction unit 160/250 are explained. The fifth embodiment is explained with reference to FIGS. 13 to 17, the sixth embodiment is explained with reference to FIG. 18 and FIG. 19, the seventh embodiment is explained with reference to FIG. 20 and FIG. 21, the eighth embodiment is explained with reference to FIG. 22, and the ninth embodiment is explained with reference to FIG. 23A and FIG. 23B.

First of all, the inter prediction unit 160/250 of the video signal decoding apparatus uses a median filter to determine a motion vector predictor (hereinafter abbreviated mvp). Yet, since there exists an error between a motion vector predictor (mvp) and an estimated motion vector, an important role of an encoder is to find an accurate motion vector predictor mvp). In the following description of a fifth embodiment of the present invention, a method (hereinafter named motion vector competition) of determining a more accurate motion vector predictor (mvp) is explained with reference to FIGS. 13 to 17.

Figure 13:
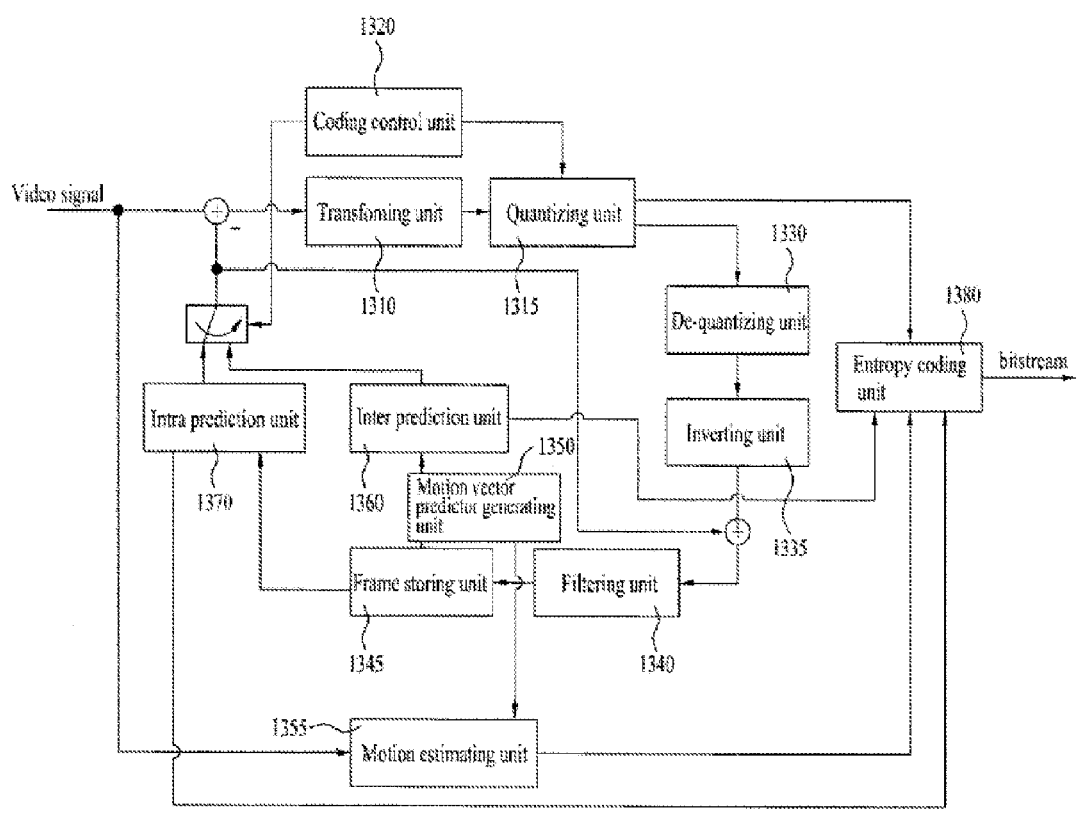
FIG. 13 is a block diagram of an apparatus for encoding a video signal according to a fifth embodiment of the present invention.
Figure 14:
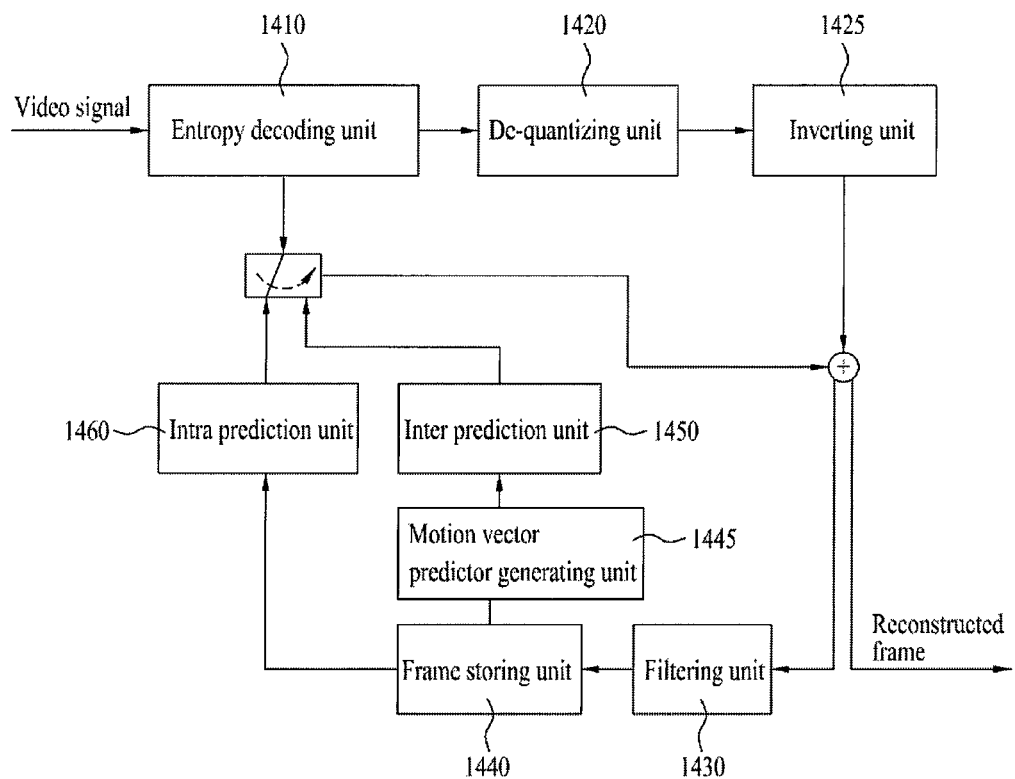
FIG. 14 is a block diagram of an apparatus for decoding a video signal according to a fifth embodiment of the present invention.

FIG. 13 is a block diagram of an apparatus for encoding a video signal which further includes a motion vector predictor generating unit 1350. And, FIG. 14 is a block diagram of an apparatus for decoding a video signal which further includes a motion vector predictor generating unit 1445.

The motion vector predictor generating unit 1350 of the encoding apparatus determines a motion vector predictor (MVP) candidate set by a preset method, determines a motion vector predictor having the best efficiency among motion vector predictors available from the determined set, and transfers motion vector predictor information (MVPI) relevant to the determined motion vector predictor.

Thus, in order to use a more accurate motion vector predictor for motion vector estimation and compensation, according to a fifth embodiment of the present invention, a candidate set of more motion vector predictors (mvp) is set and a most efficient motion vector predictor (mvp) of the motion vector predictor candidate set is used. First of all, motion vector predictors (mvp) can be mainly classified into spatial predictor, temporal predictor and spatial-temporal predictor according to types.

Figure 15:
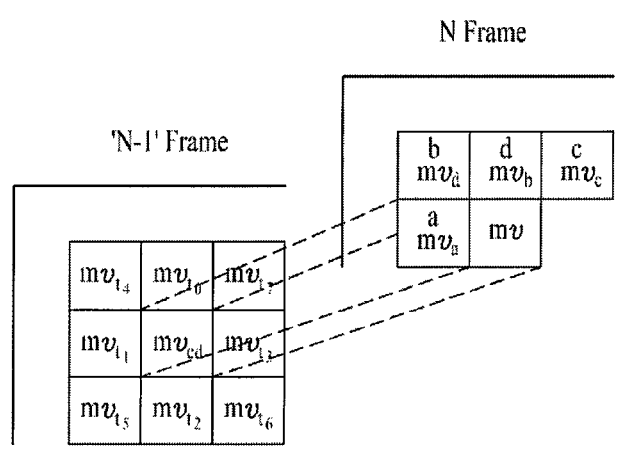
FIG. 15 is a diagram of motion vectors of current and previous frames used for motion vector prediction of a current block according to a fifth embodiment of the present invention.

FIG. 15 is a diagram of motion vectors of current and previous frames used for motion vector prediction of a current block.

Referring to FIG. 15, a spatial predictor uses a motion vector of a current frame (frame N). If a motion vector of a current vector is mv, the spatial predictor can include mv_med for adopting a median from mva, mvb, mvc and mvd using motion vectors of blocks a, b and c of the frame N and mv_spaEXT for adopting a median among at least three motion vector predictors.

Referring to FIG. 15, a temporal predictor uses a motion vector of a previous frame (frame N−1) and is able to include mv_col using a motion vector of a block co-located with a current block in a previous frame, a predictor using a median of mv_col, mvt0 . . . mvt3, and a predictor using a median of MVco1, MVt0 . . . MVt8.

And, a spatial-temporal predictor can include a motion vector predictor (mv_spt) using a mean value of mv_col, mv_col, mva, mvb and mvc.

The spatial predictor essentially used among motion vector predictors is named a first motion vector predictor. And, a spatial or temporal predictor additionally used in the fifth embodiment of the present invention is named a second motion vector predictor. The first motion vector predictor, as shown in FIG. 14, can be a median motion vector (mv_med) and the second motion vector predictor can be a motion vector predictor-a (mva) or mv_col using a motion vector of a block located left to a current block, by which various examples of the present invention are non-limited.

As mentioned in the above description, a motion vector predictor is not determined using a fixed median but is determined from various candidates. Therefore, accuracy of the motion vector predictor can be enhanced. However, if the motion vector predictors are fixed to ten kinds of candidates, it may be inefficient in coding a picture.

Therefore, a fifth embodiment of the present invention sets a new motion vector predictor candidate set (MVPCS) and proposes a condition for determining it. The motion vector predictor candidate set is represented as Table 3.

TABLE 3

| Set | Motion vector - x component | Motion vector - y component |
|---|---|---|
| 1 | Sx | Sy |
| 2 | Sx | Sy or Ty |
| 3 | Sx or Tx | Sy |
| 4 | Sx or Tx | Sy or Ty |

In Table 3, 'S' indicates a spatial predictor and 'T' indicates a temporal predictor.

A spatial predictor for the motion vector predictor candidate set uses mv_med only, and mvcol is usable as a temporal predictor, which non-limits various examples of the present invention. If a set 4 is determined as the motion vector predictor candidate set, available motion vector predictors include four kinds of cases (Sx–Sy, Sx–Ty, Tx–Sy, Tx–Ty). Therefore, it is able to determine a more accurate motion vector predictor based on a motion cost of each of the four kinds of cases.

Figure 16A:
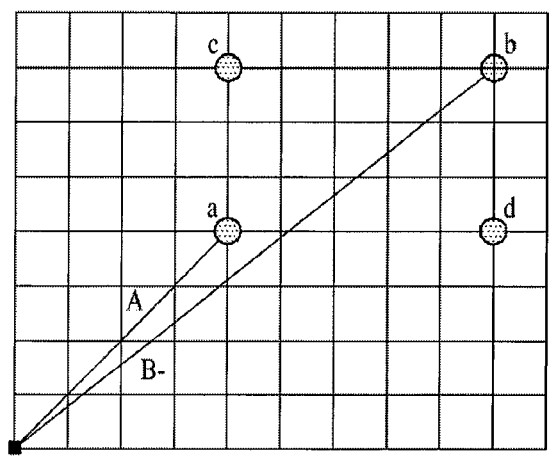
FIG. 16A and FIG. 16B are diagrams for combinations of available motion vector predictors in a motion vector predictor determining method according to a fifth embodiment of the present invention.
Figure 16B:
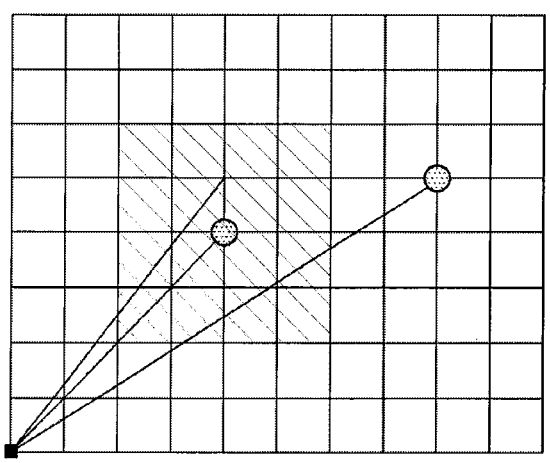

FIG. 16A and FIG. 16B are diagrams for combinations of available motion vector predictors in a motion vector predictor determining method according to a fifth embodiment of the present invention. FIG. 16A shows that a current block corresponds to a skip mode, whereas FIG. 16B shows a case except the skip mode.

First of all, since a skip mode of a related art uses a motion vector predictor of a previous frame as a motion vector of a current block, there exists a single motion vector predictor candidate only. On the contrary, in a method according to the motion vector predictor competition of the present invention, a motion vector predictor candidate uses a second motion vector predictor as well as a first motion vector predictor, whereby maximum four combinable candidates can exist.

Referring to FIG. 16A, a first motion vector predictor of a current block can be 'A' and a second motion vector predictor can be 'B'. Hence, motion vector candidates according to the combination thereof can include 'a (first motion vector predictor)', 'b (second motion vector predictor)', 'c (first motion vector predictor component x–second motion vector predictor component y)', or 'd (second motion vector predictor component x–first motion vector predictor component y)'. In this case, 2 bits can be required for motion vector predictor information for a motion vector predictor.

Referring to FIG. 16B, if a current block is not in a skip mode and is partitioned, more bits are required for motion vector predictor information. Hence, a distance (mv1-mv2) between a first motion vector predictor and a second motion vector predictor is measured. When the measured distance between the first and second motion vector predictors is equal to or smaller than ½ pixel, if the two predictors are close to each other, the first motion vector predictor is determined as a motion vector predictor of a current block and a related art motion vector prediction method is used. In this case, it is able to use a motion vector predictor competition flag (mv_competition_flag) indicating whether a current block uses the related art motion vector prediction method or the motion vector competition.

Once the first motion vector predictor is determined as the motion vector predictor of the current block, the motion vector predictor competition flag (mv_predictor_competition_flag) indicating that the related art motion vector prediction method is used is set to 0 and is then transferred. The meaning of the motion vector predictor competition flag information is represented as Table 4.

TABLE 4

| Mv_competition_flag | Meaning |
|---|---|
| 0 | Current block does not use MV competition (related art MV competition is used) |
| 1 | Current block uses MV competition. |

Figure 17:
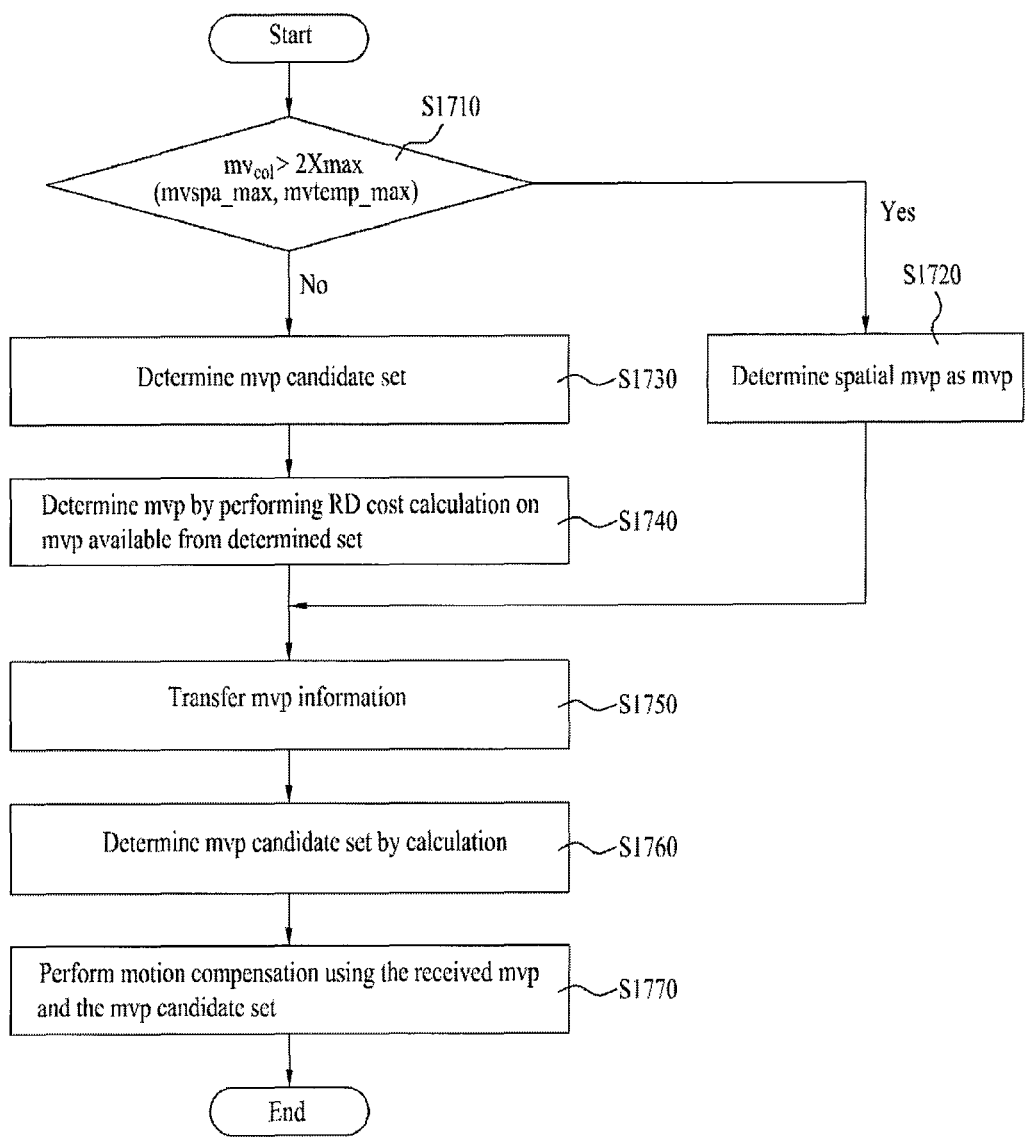
FIG. 17 is a flowchart for a sequence of motion vector predictor competition and motion compensation according to a fifth embodiment of the present invention.
Figure 18:
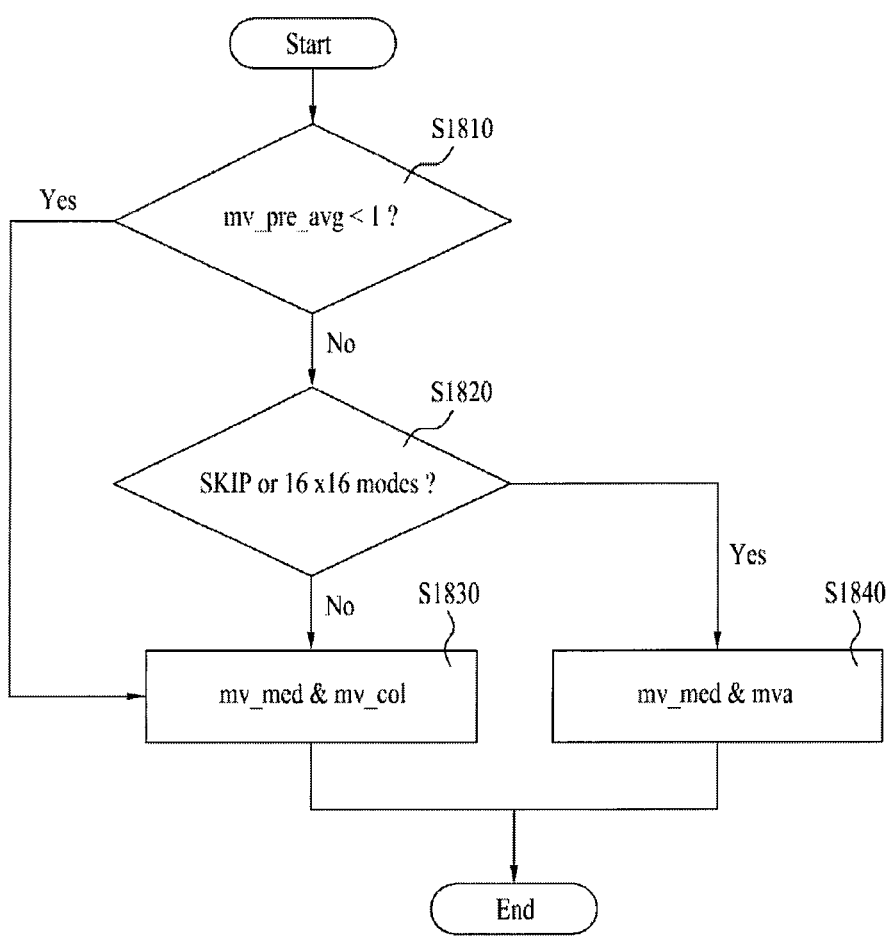
FIG. 18 is a flowchart for a method of determining a motion vector predictor candidate according to a sixth embodiment of the present invention.

FIG. 17 is a flowchart for a sequence of motion vector predictor competition and motion compensation according to a fifth embodiment of the present invention.

Referring to FIG. 17, before a motion vector predictor candidate set is determined, Formula 2 is calculated [S1710]

$$MV_{col} > 2*\max(MV_{spa\_max}, MV_{temp\_max})$$ [Formula 2]

If a value of mv_col using a motion vector of a block co-located with a current block in a previous frame is too great, it means that correlation between the previous frame and the current block is reduced too much. Hence, instead of using a temporal predictor for a case that the condition of Formula 2 is met ['yes' in the step S1710], a motion vector predictor is determined using a spatial predictor only [S1720]. Whether to use a spatial predictor as a motion vector predictor only can be separately determined for a component x and a component y.

On the contrary, if the condition of Formula 2 is not met [;n' in the step S1710], a motion vector predictor candidate set to use is determined by calculating the condition of Formula 3 or Formula 4. Formula 3 shows a condition for a motion vector skip mode and Formula 4 is a condition for a case except a skip mode.

$$Set1: S_x = T_x, S_y = T_y$$

$$Set2: S_x = T_x, S_y! = T_y$$

$$Set3: S_x! = T_x, S_y = T_y$$

$$Set4: S_x! = T_x, S_y! = T_y$$ [Formula 3]

$$Set1: |S_x - T_x| < 3, |S_y - T_y| < 3$$

$$Set2: |S_x - T_x| < 3, |S_y - T_y| \geq 3$$

$$Set3: |S_x - T_x| \geq 3, |S_y - T_y| < 3$$

$$Set4: |S_x - T_x| \geq 3, |S_y - T_y| \geq 3$$ [Formula 4]

The motion vector predictor generating unit 1350/1445 determines a most efficient motion vector predictor candidate set using the above condition. For instance, as a result of examining the conditions of my med(Sx, Sy) and mv_col(Tx, Ty), if a set 3 is determined as the motion vector predictor candidate set, there van be two kinds (Sx–Sy or Tx–Sy) of available motion vector predictors (mvp). In this case, by measuring a motion cost in case of using each of the motion vector predictors, a motion vector predictor (Sx–Sy) of the current block is determined [S1740].

Subsequently, motion vector predictor (mvp) information indicating what kind of combination of motion vector predictors (Sx–Sy) is used is transferred [S1750]. In this case, the motion vector predictor information can include information on a spatial predictor if my col is twice greater than a maximum value of either mv_spa_max or my temp max ['yes' in the step S1710].

The motion compensating unit 1445 of the decoding apparatus according to the present invention receives the motion vector predictor (mvp) information and then determines a motion vector predictor candidate set by calculating the condition of Formula 3 or Formula 4 on the current block by itself [S1760].

Subsequently, using the received motion vector predictor information and the condition of the determined set, the motion compensating unit 1445 performs motion compensation of the current block [S1770].

Therefore, by selecting a predictor more homogeneous to a motion vector of a current block using various motion vector predictor candidates, more accurate motion vector prediction is possible.

In case of using the related art motion vector competition, the reduction of bitrate is about −0.5% of the case of using the conventional AVC scheme. In case of using the motion vector competition according to the fifth embodiment of the present invention, the bitrate is reduced about −0.8%. Moreover, PSNR (peak signal to noise ratio) in case of using the motion vector competition according to the fifth embodiment of the present invention is enhanced by about 0.028 dB more than that of the case of using the related art method.

Therefore, the motion vector competition according to the fifth embodiment of the present invention selects a motion vector predictor more homogeneous to a motion vector of a current block using various motion vector predictor candidates, thereby enabling more accurate motion vector prediction.

A sixth embodiment of the present invention is able to determine a motion vector predictor candidate according to a mean value of motion vectors of a previous frame and a type of a current block. The motion vector predictor candidate determining method will be explained with reference to FIG. 18.

First of all, since frame having big motions are consecutive in general, it is able to determine whether a current frame has correlation with the previous frame according to an average size of motion vectors of the previous frame. If a mean value of motion vectors of a previous frame is equal to or greater than a threshold, a motion of a current frame is greater than that of the previous frame. Hence, correlation with the previous frame is reduced. Accordingly, at least two spatial predictors are usable as motion vector predictor candidates. On the contrary, if a mean value of motion vectors of a previous frame is smaller than a threshold, a motion of a current frame is smaller than that of the previous frame. Hence, correlation with the previous frame is great. Accordingly, it is efficient to use a temporal predictor, which uses a motion vector of the previous frame. In this case, the motion vector predictor candidate can include at least one temporal predictor as well as at least one spatial predictor.

Therefore, in a motion vector predictor candidate determining method according to a sixth embodiment of the present invention, it is determined whether an average (mv_pre_avg) of a motion vector size of a previous frame is equal to or smaller than 1 [S1810]. If the average (mv_pre_avg) of a motion vector size of a previous frame is greater than 1, it indicates a current frame including a current block is the frame having a great motion. In this case, according to the sixth embodiment of the present invention, since correlation between the current block and the previous frame is small, it is efficient to use two spatial predictors. Yet, if the current block includes sub-blocks having small homogeneity, it is not efficient to use two spatial predictors.

Hence, it is checked whether a block type of the current block is a skip mode or 16*16 mode [S1820]. If the block type is neither the skip mode or the 16*16 mode ['no' in the step S1820], the current block is partitioned into sub-blocks and the correlation between the partitioned sub-blocks is small. In this case, it is more efficient to use the temporal predictor than to use the spatial predictor as a second motion vector predictor [S1830].

If the current block is the skip mode or the 16*16 mode, it is efficient to use a spatial predictor as a second motion vector predictor as well as use a spatial predictor as a first motion vector predictor [S1840].

If the average of the motion vectors of the previous frame is smaller than 1 ['yes' in the step S1810], it means that the current frame is a slow picture having great homogeneity between the current block and the previous frame. Therefore, it is efficient to use spatial predictors as first and second motion vector predictors.

Thus, in a manner of determining a motion vector predictor candidate different according to the homogeneity between a current block and a previous frame and a type of the current block, it is able to enhance clarity of motion prediction of the current block.

The motion vector predictor information generated by the motion vector competition according to the fifth or sixth embodiment of the present invention requires two bits. If a current block is 8*8 block, it is able to require motion vector predictor information to have maximum 16 bits according to partitioning. This may result in that the related art motion vector prediction method is efficient. Therefore, each block can include motion vector competition flag information (mv_competition_flag) indicating whether to follow the motion vector competition.

Table 5 represents conditions used for the test to compare effect of the motion vector competition according to the sixth embodiment of the present invention to effect of the related art. Table 6 represents a motion vector candidate used in performing motion prediction on the conditions shown in Table 5.

TABLE 5

| | |
|---|---|
| No. of frames | 150(15 Hz)/300(30 Hz) |
| Motion estimation | Full Search |
| No. of references | 4 |
| Motion vector searchrange | ±32 |
| GOP structure | IPPP |
| Entropy coding scheme | CAVLC |
| Quantization coefficient(QP) | 22/27/32/37 for I slice<br>23/28/33/38 for P slice |

TABLE 6

| Case 1 | Skip mode | mv_spaEXT, mva |
|---|---|---|
| | Except skip mode | mv_med, mv_col |
| Case 2 | Skip mode | mv_med, mva |
| | Except skip mode | mv_med, mv_col |
| Case 3 | All cases | mv_med, mv_col |

In this case, if three vectors are available, 'mv_spaEXT' is determined using mva, mvb and mvc shown in FIG. 15. Otherwise, 'mv_spaEXT' is determined using an available motion vector among mva, mvb and mvc.

Figure 19:
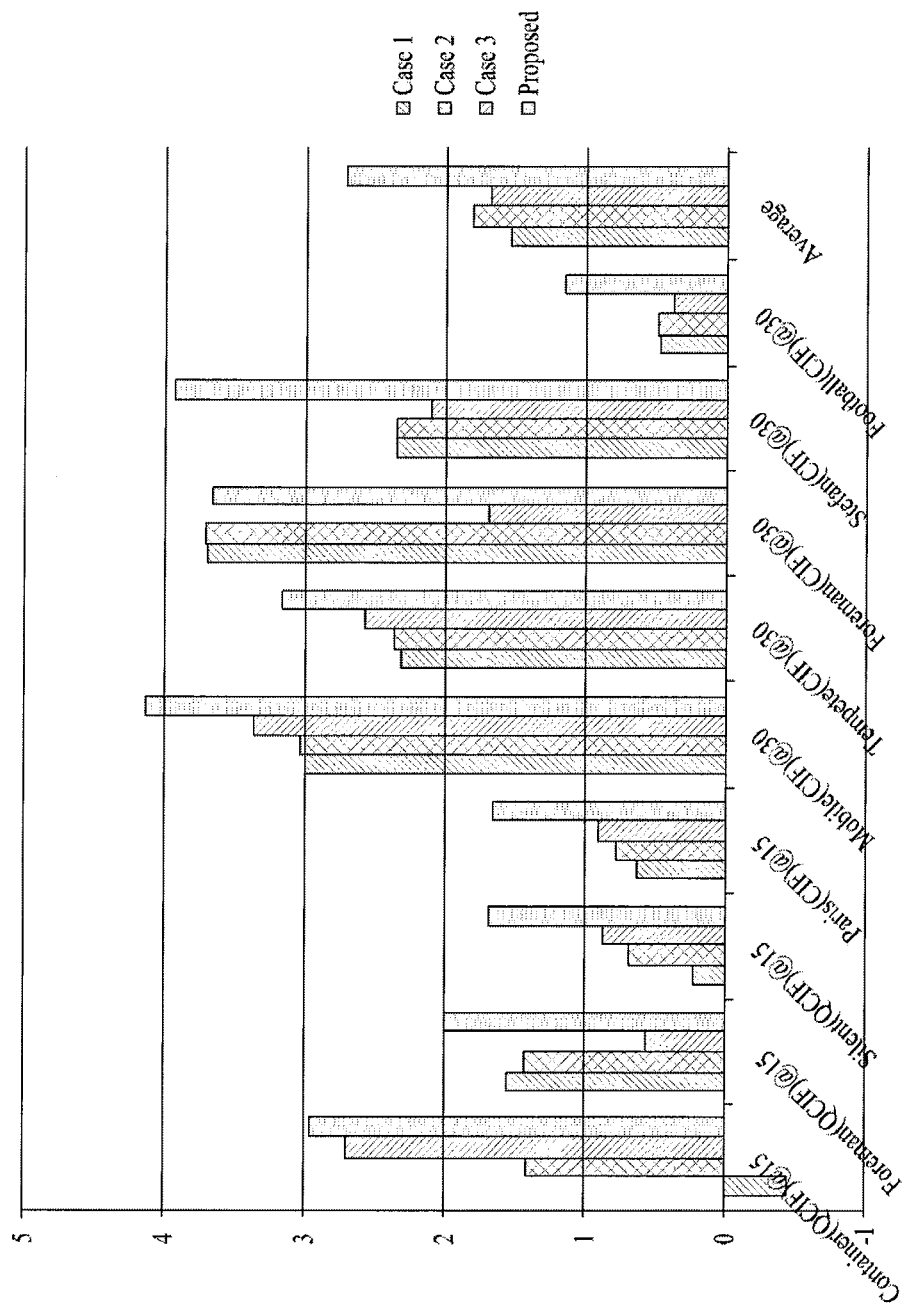
FIG. 19 is a graph of BD rate compression ratio in case according to a sixth embodiment of the present invention.

FIG. 19 shows BD rate gains for the case of using motion vectors of Cases 1 to 3 as motion vector predictor candidates and the case of using a motion vector predictor determined according to the sixth embodiment of the present invention. The BD rate is an index indicating coding performance and means how much a bitrate is compressed by maintaining the same image quality.

Referring to FIG. 19, it can be observed that the compressed extent of the bitrate in case of the sixth embodiment of the present invention is generally increased more than that of the case of using the motion vector predictor candidates shown in Cases 1 to 3. And, it can be observed that PSNR[dB] is substantially increased by about 0.1 dB more than that of the video signal decoding method according to the fifth embodiment of the present invention.

Figure 20:
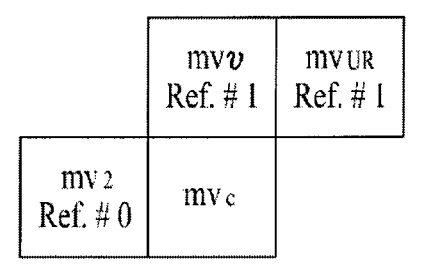

In the following description, a new method of using a generated motion vector predictor by considering a distance between a block for performing motion estimation of a current block and a neighbor block according to a seventh embodiment of the present invention is explained with reference to FIG. 20 and FIG. 21.

In the related art, a motion vector predictor of a current block is generated using three blocks neighbor to the current block. FIG. 20 shows a current block and three neighbor blocks. And, the three neighbor blocks include a block left to the current block, a block above the current block and a block upper-right to (in a diagonal-up-right direction of) the current block. Referring to FIG. 20, a motion vector of the current block is named mvc, a motion vector of the left block of the current block is named mv1, and a motion vector of the upper-right block is named mvur. In order to determine a motion vector predictor of the current block, it is checked whether at least one of reference indexes of the three neighbor blocks is equal to a reference index of the current block. If there is one neighbor block having the same reference index of the current block, a motion vector of the corresponding neighbor block is determined as a motion vector predictor. Otherwise (i.e., if there are at least two or more neighbor blocks having the same reference number), a median of motion vectors of the three neighbor blocks is selected and determined as a motion vector predictor of the current block. Moreover, a reference index is determined as a smallest number among the reference indexes of the three neighbor blocks.

However, if a reference index of the current block has a reference index differing from the reference indexes of the three neighbor blocks, the motion vector predictor determined in the above manner may have a big difference from a motion vector of the current block. In order to make the determined motion vector predictor become homogeneous to a motion vector of the current block, it is efficient to use 'scaled motion vector predictor' according to a seventh embodiment of the present invention.

Figure 21:
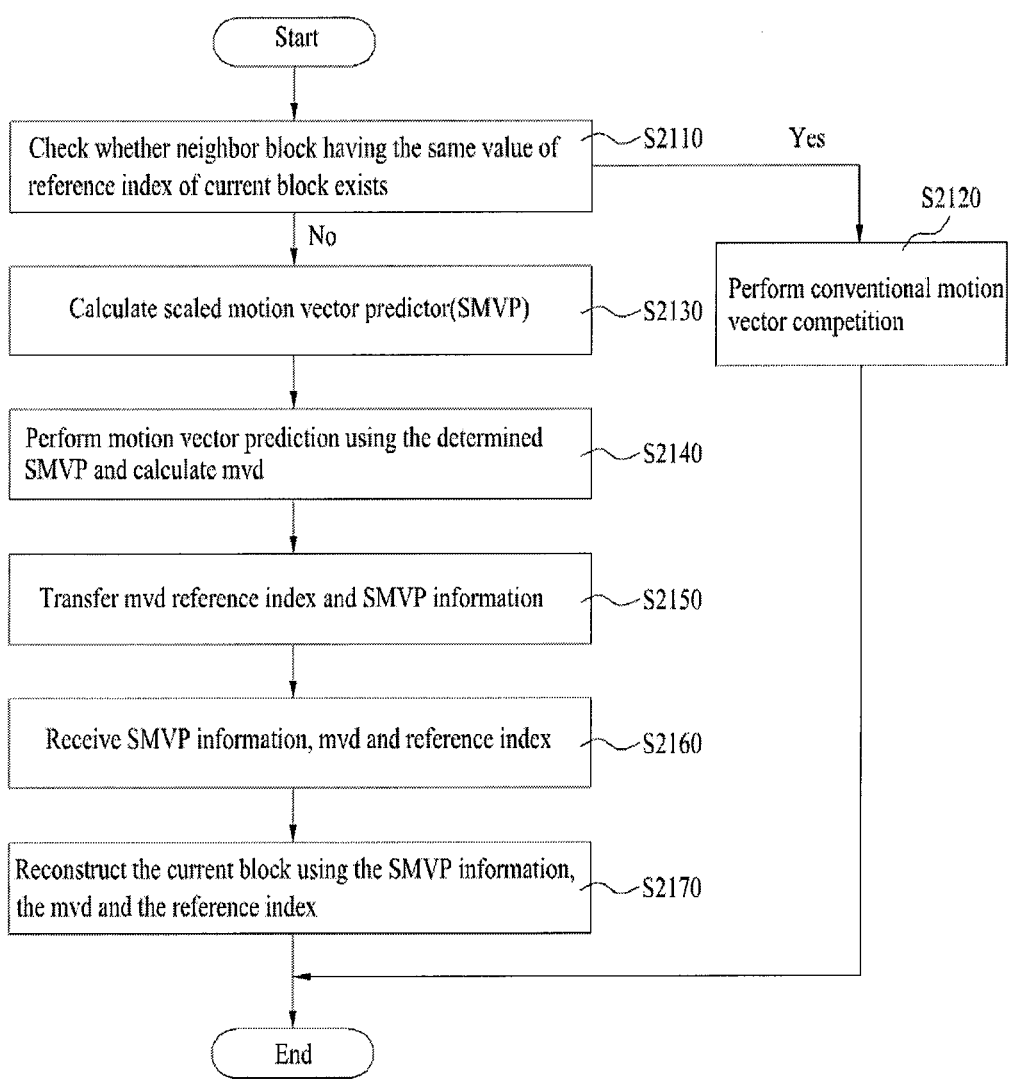

FIG. 21 is a flowchart for a method of performing motion prediction using a scaled motion vector predictor according to a seventh embodiment of the present invention.

Referring to FIG. 21, in performing motion vector prediction, it is checked whether there is a neighbor block having the same value of a reference index of a current block [S2110]. If there is a neighbor block having the same value of a reference index of a current block, the related art motion vector competition is adopted [S2120]. Yet, if a reference index of the current block fails to match that of a neighbor block ['no' in the step S2110], scaled motion vector predictors (SMVP) are calculated [S2130]. And, it is able to find the scaled motion vector predictor using Formula 5.

$$MV'_L = \frac{f_{ME} - f_c}{f_L - f_c} * MV_L, \quad MV'_U = \frac{f_{ME} - f_c}{f_U - f_c} * MV_U,$$
$$MV'_{UR} = \frac{f_{ME} - f_c}{f_{UR} - f_c} * MV_{UR}$$
[Formula 5]

In Formula 5, $f_{ME}$ indicates a frame number of a block for performing motion estimation on a current block, $f_c$ indicates a frame number of the current block, and $f_L$, $f_U$ and $f_{UR}$ indicate left, upper and upper right blocks of the current block, respectively.

A motion vector predictor of the current block is determined from the scaled motion vector predictors, and motion vector prediction of the current block is performed using the determined scaled motion vector predictor [S2140]. And, a motion vector difference (mvd), a reference index and scaled motion vector predictor information are transferred [S2150]. Moreover, it is able to transfer scaled motion vector predictor flag information (scaled_mv_predictor_flag) indicating whether the scaled motion vector predictor is used for the motion vector prediction of the current block. In case that the scaled motion vector predictor information is used, the meaning of the flag information can be represented as Table 7.

TABLE 7

| scaled_mv_predictor_flag | Meaning |
|---|---|
| 0 | Current block does not use scaled MV predictor. (Related art MV predictor competition is used) |
| 1 | Current block uses scaled MV predictor. |

The inter prediction unit 250 of the decoding apparatus according to the present invention receives the scaled motion vector predictor information, the mvd and the reference index [S2160] and then reconstructs a motion vector of the current block using the received ones [S2170]. In case of transferring the scaled motion vector predictor flag information (scaled_my_predictor_flag), the scaled motion vector predictor information may not be transferred. In this case, if a value of the scaled motion vector predictor flag information (scaled_mv_predictor_flag) is 1, it is able to find a scaled motion vector predictor using the received reference index, the received mvd and the motion vector of the neighbor block. The motion vector of the current block is then reconstructed using the found scaled motion vector predictor.

In a method of predicting a motion vector of a current block according to a seventh embodiment of the present invention, a motion vector predictor is determined by considering a distance between a frame indicated by a reference index of the current block and a frame indicated by a reference index of a neighbor block, whereby the determined motion vector predictor can have a value more homogeneous to that of the motion vector of the current block. Therefore, it is able to raise accuracy of prediction.

A method of predicting a current block using a motion vector can code a current block more accurately in a picture having a big motion. Yet, a corresponding bit demanding rate is high. Hence, this method uses a skip mode on predetermined condition. The skip mode uses a motion vector (mvP) of a neighbor block as a motion vector of a current block instead of calculating a motion vector (MV) difference using a neighbor block as a motion vector predictor. In case of using a skip mode, such information as residual, reference index, CBP (coded block pattern) and the like is not coded. Yet, H.264 allows 16*16 block to be used for a case of adopting a skip mode only. Hence, two or more motion vectors are not allowed for each 16*16 block.

Eighth embodiment of the present invention proposes a partially skip mode that enables a unit block having a motion vector to have various sizes in a skip mode.

FIG. 22 is a diagram of a block size used in a partially skip mode.

Referring to FIG. 22, a partially skip mode is able to use 16*8 block, 8*16 block or 8*8 block as well as 16*16 block. The partially skip mode can have maximum four motion vectors (in case of using 8*8 block) within 16*16 block, whereas the related art skip mode has a single motion vector per 16*16 block.

Therefore, a current block decoding method using a partially skip mode minimizes picture distortion and activates a skip mode more, thereby raising coding efficiency.

Since a partially skip mode according to an eighth embodiment of the present invention uses a new block type, it is able to further transfer information on a type of a block using the partially skip mode. The information on the block type may correspond to skip_16*16, skip 16*8, skip 8*16, or skip P8*8 according to a block size, by which various examples are non-limited. And, it is able to transfer partially skip mode flag information (partially_skip_flag) indicating whether a related art skip mode or a partially skip mode of the present invention is used. The meaning of the flag information is represented as Table 8.

TABLE 8

| Partially_skip_flag | Meaning |
| --- | --- |
| 0 | Current block does not use partially skip mode. (Related art skip mode is used.) |
| 1 | Current block uses partially skip mode. |

The inter prediction unit 250 of the decoding apparatus according to the present invention receives the block type information and the partially skip mode flag information. If the partially skip mode is used, the inter prediction unit 250 uses a motion vector of a block co-located with a current block in a previous frame as a motion vector of the current block. If so, the skip mode is further activated to raise coding efficiency. And, it is also able to raise a reconstruction rate of a current block using motion vectors more than those of the related art skip mode.

Meanwhile, it may be more efficient for a decoder to derive and use information relevant to a motion vector of its own instead of receiving any information relevant to the motion vector from an encoder. Thus, a video signal decoding apparatus can use a direct mode for deriving information required for motion estimation of a current block. This direct mode includes a spatial direct mode and a temporal direct mode. The spatial direct mode derives a motion vector of a current block and a reference index from a neighbor block on a decoder. And, the temporal direct mode is performed in the same manner of the related art picture-B direct mode. Unlike the temporal direct mode, the spatial direct mode is restricted to derive and use a single motion vector by 16*16 block unit only even if P8*8 block adopts the spatial direct mode.

Therefore, a ninth embodiment of the present invention proposes 8*8-based spatial direct mode capable of using various motion vectors in a spatial direct mode.

Figure 23A:
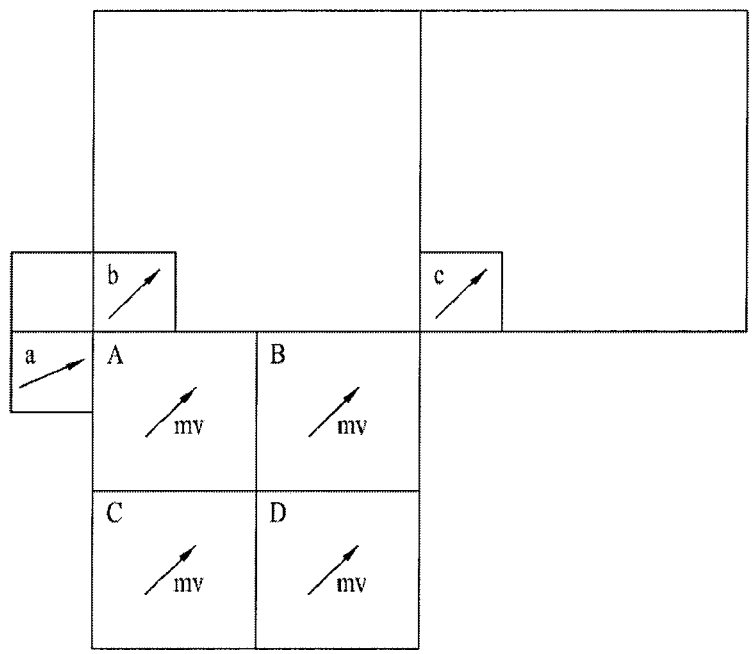
FIG. 23A is a diagram for motion vectors of P8*8 blocks adopting a spatial direct mode according to a related art.
Figure 23B:
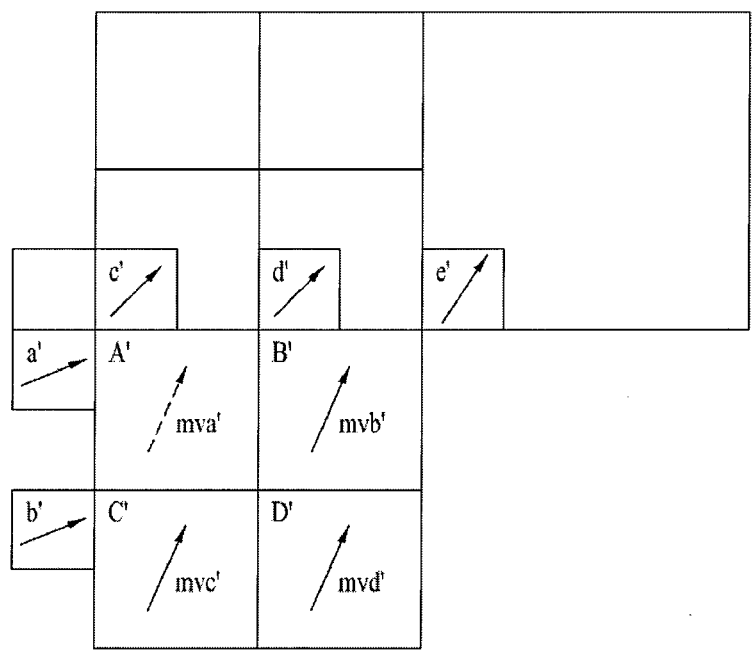
FIG. 23B is a diagram for motion vectors of 8*8 block according to a ninth embodiment of the present invention.

FIG. 23A is a diagram for motion vectors of P8*8 blocks adopting a spatial direct mode according to a related art and FIG. 23B is a diagram for motion vectors of 8*8 block according to a ninth embodiment of the present invention.

Referring to FIG. 23A, in a related art method, if a current block is P8*8 block and uses a direct mode, P8*8 blocks constructing 16*16 block have the same motion vector and reference index. Blocks A, B, C and D, as shown in FIG. 23A, derive to use the same motion vector (mv) and reference index through median filtering using block-a (located left to the 16*16 block), block-b (located above the 16*16 block) and block-c (located at upper right side of the 16*16 block).

Referring to FIG. 23B, 8*8-based spatial direct mode of the present invention derives to use various motion vectors using neighbor blocks. In FIG. 23B, block-A' uses a median of motion vectors of neighbor blocks block-a', block-b', block-c' and block-d' as a motion vector (mva') of the block-A'. Block-B' uses motion vectors of neighbor blocks block-a', block-d' and block-e' as a motion vector (mvb'). Block-C' derives a motion vector (mvc') using block-b', block-c' and block-d'. And, block-D' derives a motion vector (mvd') using block-b', block-d' and block-e'. In this case, as a reference index, a smallest value among reference indexes of the used neighbor blocks like the related art is selected to raise coding efficiency.

Thus, the 8*8-based spatial direct mode uses at least two motion vectors within 16*16 block by calculating a motion vector for each P8*8 block. Therefore, it is advantageous in having a high reconstruction rate in case that a current block is located on a boundary area or a small object s moving.

A method of processing a video signal, which further includes a step of rearranging video signals in a discrete cosine transform step, according to another embodiment of the present invention is explained with reference to FIG. 24 and FIG. 25 as follows. This method reduces a bit rate and an error from an original picture.

Figure 24:
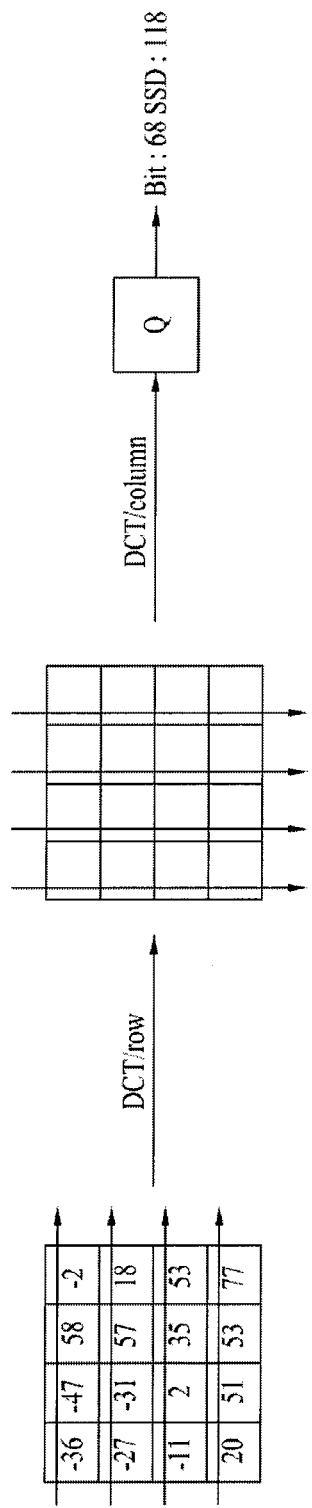
FIG. 24 is a diagram for performing a general DCT method.

Referring to FIG. 24, in discrete cosine transform of the related art, a video signal is transformed into 2-dimensional frequency component. And, a size of each base component included in a block of the transformed video signal is found. Quantization and zigzag scan are then performed. The video signal for this discrete cosine transform uses 2-dimensional transform scheme. In particular, transform is performed in a row direction. Another transform is then performed in a column direction.

Besides, it is able to more enhance a compression ratio by deriving a block having a small coefficient to gather in DC component prior to the transform in each direction. Therefore, a tenth embodiment of the present invention further includes the step of rearranging blocks prior to the transform in each direction by considering a residual and coefficient of each block, thereby enhancing a compression ratio in a manner of enabling a discrete cosine transform coefficient to gather closer around the DC component that that of general discrete cosine transform. In the following description, a case that blocks for performing rearrangement are residual signal is explained.

Figure 25:
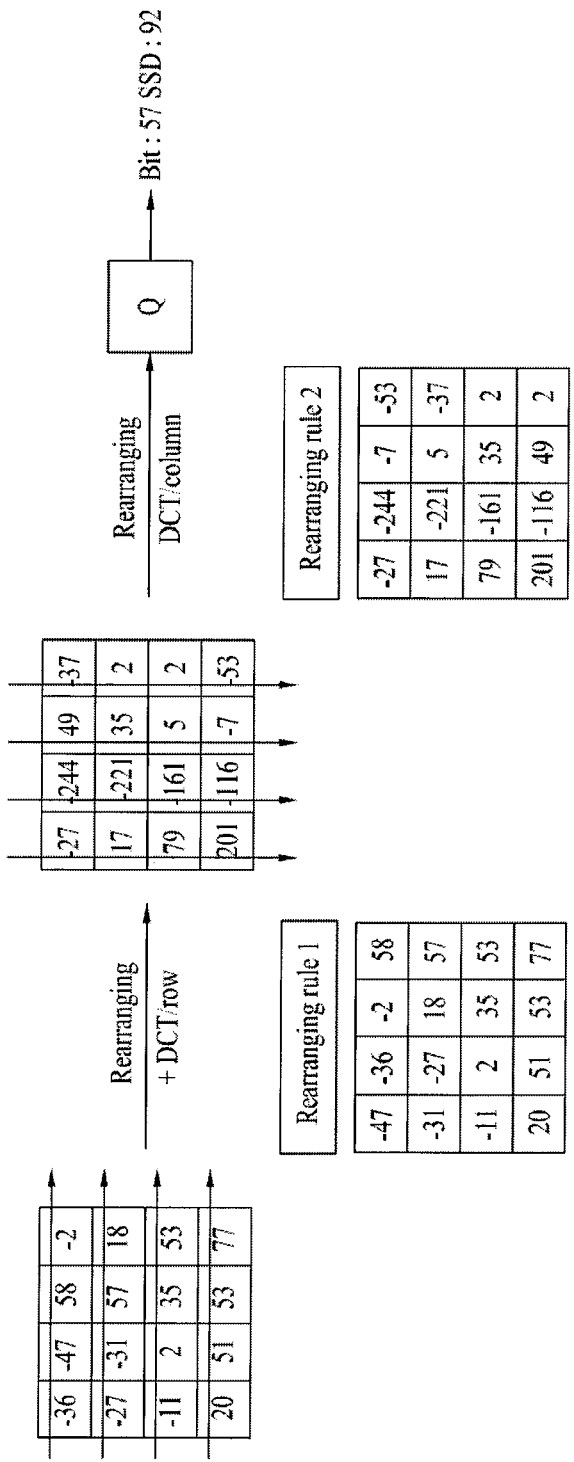
FIG. 25 is a diagram for a discrete cosine rearrangement transform method according to a tenth embodiment of the present invention.

Referring to FIG. 25, discrete cosine rearrangement transform according to a tenth embodiment of the present invention includes a first rearranging step and a second rearranging step prior to a row and column directional transforming step.

In the first rearranging step, a block having a small value is arranged on a left side by comparing residuals of blocks in a row direction, first rearrangement information indicating the rearrangement order is generated, and discrete cosine transform is then performed in the row direction.

In the second rearranging step, the block having the small value is rearranged on an upper side in a column direction with reference to a residual discrete-cosine-transformed in the row direction and second rearrangement information indicating the rearrangement order is then generated. This embodiment of the present invention regards the method of rearrangement by comparing the residuals of the respective blocks to each other, by which various examples of the present invention are non-limited.

As mentioned in the above description, if the discrete cosine transform is performed in a manner of rearranging residual signals to enable a block having a small residual to be located at a left or upper side in a row or column, discrete cosine transform coefficients are distributed by gathering around the left side DC component). Therefore, it is able to obtain more enhanced compression effect.

Moreover, the encoding/decoding method of the present invention can be implemented in a program to be executed in a computer and can be recorded in a computer-readable recording medium. And, multimedia data having a data structure according to the present invention can be recorded in a computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bit stream produced by the encoding method is stored in a computer-readable recording medium or can be transmitted via wireline/wireless communication network.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Accordingly, the present invention is applicable to audio encoding and decoding.

The invention claimed is:

1. A method of decoding a video signal with a decoding apparatus, comprising:
receiving, with the decoding apparatus, the video signal, the video signal including motion vector information of a current block, the motion vector information indicating a motion vector candidate used for the current block;
determining, with the decoding apparatus, a motion vector candidate set of the current block, the motion vector candidate set including a plurality of motion vector candidates, the plurality of motion vector candidates being comprised of at least one of a spatial motion vector and a temporal motion vector;
deriving, with the decoding apparatus, a predicted motion vector of the current block from the motion vector candidate set of the current block,
performing, with the decoding apparatus, motion compensation on the current block using the predicted motion vector of the current block,
wherein deriving the predicted motion vector of the current block from the motion vector candidate set of the current block comprises:
extracting, with the decoding apparatus, the motion vector candidate corresponding to the motion vector information from the motion vector candidate set, and
determining, with the decoding apparatus, the predicted motion vector of the current block using the extracted motion vector candidate.

2. The method of claim 1, wherein determining the motion vector candidate set depends on whether the current block adopts a skip mode.

3. The method of claim 2, wherein if the current block adopts the skip mode, the motion vector candidate set further includes at least one of a first spatial-temporal motion vector and a second spatial-temporal motion vector, the first spatial-temporal motion vector being comprised of an x-component of the spatial motion vector and a y-component of the temporal motion vector, the second spatial-temporal motion vector being comprised of an x-component of the temporal motion vector and a y-component of the spatial motion vector.

4. The method of claim 2, wherein if the current block does not adopt the skip mode, the motion vector candidate set is determined based on a distance between an x-component of the spatial motion vector and an x-component of the temporal motion vector and a distance between a y-component of the spatial motion vector and a y-component of the temporal motion vector.

5. The method of claim 1, wherein the motion vector candidate set is determined based on an average of a motion vector of a previous picture and a type of the current block.

6. The method of claim 5, wherein if the average of the motion vector of the previous picture is smaller than 1, the motion vector candidate set includes the spatial motion vector and the temporal motion vector.

7. The method of claim 5, wherein if the average of the motion vector of the previous picture is greater than 1 and if the type of the current block is a skip mode or 16*16 block, the motion vector candidate set including the spatial motion vector and the temporal motion vector.

8. The method of claim 1, wherein the determining the motion vector candidate set includes checking whether a reference index of the current block is equal to reference indexes of neighboring blocks, the neighboring blocks including left block, top block and top-right block adjacent to the current block, a motion vector of a neighboring block having a same reference index as the current block is used as the spatial motion vector if the neighboring block having the same reference index as the current block exists according to the checking.

9. The method of claim 8, wherein the determining the motion vector candidate set further includes scaling a motion vector of a neighboring block by considering a temporal distance between a current picture including the current block and a reference picture of the current block if the neighboring blocks having the same reference index as the current block does not exists according to the checking, the scaled motion vector of the neighboring block is used as the spatial motion vector.

10. The method of claim 1, wherein the temporal motion vector is a motion vector of a co-located block with the current block in a frame other than a current picture including the current block.

* * * * *